United States Patent [19]
Abe et al.

[11] Patent Number: 5,875,047
[45] Date of Patent: *Feb. 23, 1999

[54] OPTICAL TRANSCEIVER UNIT

[75] Inventors: Akio Abe; Shigeichi Izumi; Mitsuru Yumoto, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 583,633

[22] Filed: Jan. 5, 1996

[30] Foreign Application Priority Data

Jan. 9, 1995 [JP] Japan .................................. 7-001195
Sep. 20, 1995 [JP] Japan .................................. 7-242073

[51] Int. Cl.⁶ .......................... H04B 10/00; H04B 10/04; H04B 10/06
[52] U.S. Cl. ........................ 359/152; 359/163; 359/180; 359/189
[58] Field of Search .................................. 359/163, 180, 359/152, 189; 455/90, 128, 347; 361/720, 730, 748, 752; 385/35; 257/81, 99

[56] References Cited

U.S. PATENT DOCUMENTS

| | | | |
|---|---|---|---|
| 5,459,639 | 10/1995 | Izumi ....................................... | 361/707 |
| 5,479,288 | 12/1995 | Ishizuka et al. ......................... | 359/163 |
| 5,528,408 | 6/1996 | McGinley et al. ...................... | 359/163 |
| 5,535,034 | 7/1996 | Taniguchi ................................ | 359/163 |

OTHER PUBLICATIONS

Nozu, Chapter II, "Theory Required for Noise Processing" (the latest technology of a countermeasure against noise), Jul. 1986, pp. 7–61 with an English language translation consisting of pp. 1–109 and a 9–page translation of the drawings.

Patent Abstracts of Japan, vol. 127 (E–1516) & JP–A–5–315767 filed Nov. 26, 1993, Tsuzumi, "Excess Length Processing Structure for Optical Fiber".

Primary Examiner—Kinfe-Michael Negash
Attorney, Agent, or Firm—Staas & Halsey

[57] ABSTRACT

An optical receiver unit has an optical receiver module which includes an opto-electric converter housed in a metal container, a printed-circuit board having power, signal and ground terminals connected to the opto-electric converter, a casing body which includes a board receptacle and a module receptacle, respectively for accommodating the printed-circuit board and the optical receiver module, and a cover for covering the casing body. The casing body and the cover are both molded out of synthetic resin and have respective, first and second metallized internal surfaces. The cover covers the casing body so that the second metallized internal surface of the cover contacts the first metallized internal surface of the casing body. The ground line is connected to the metal container of the optical receiver module.

34 Claims, 21 Drawing Sheets

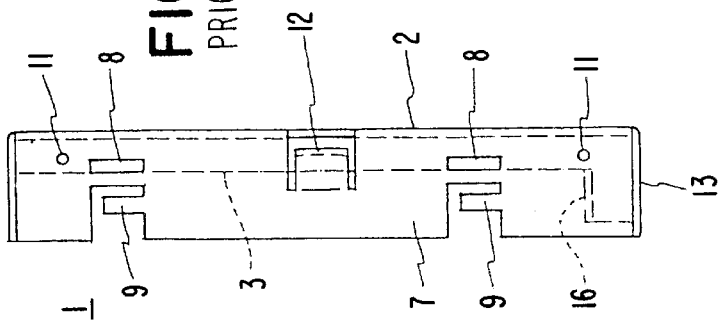
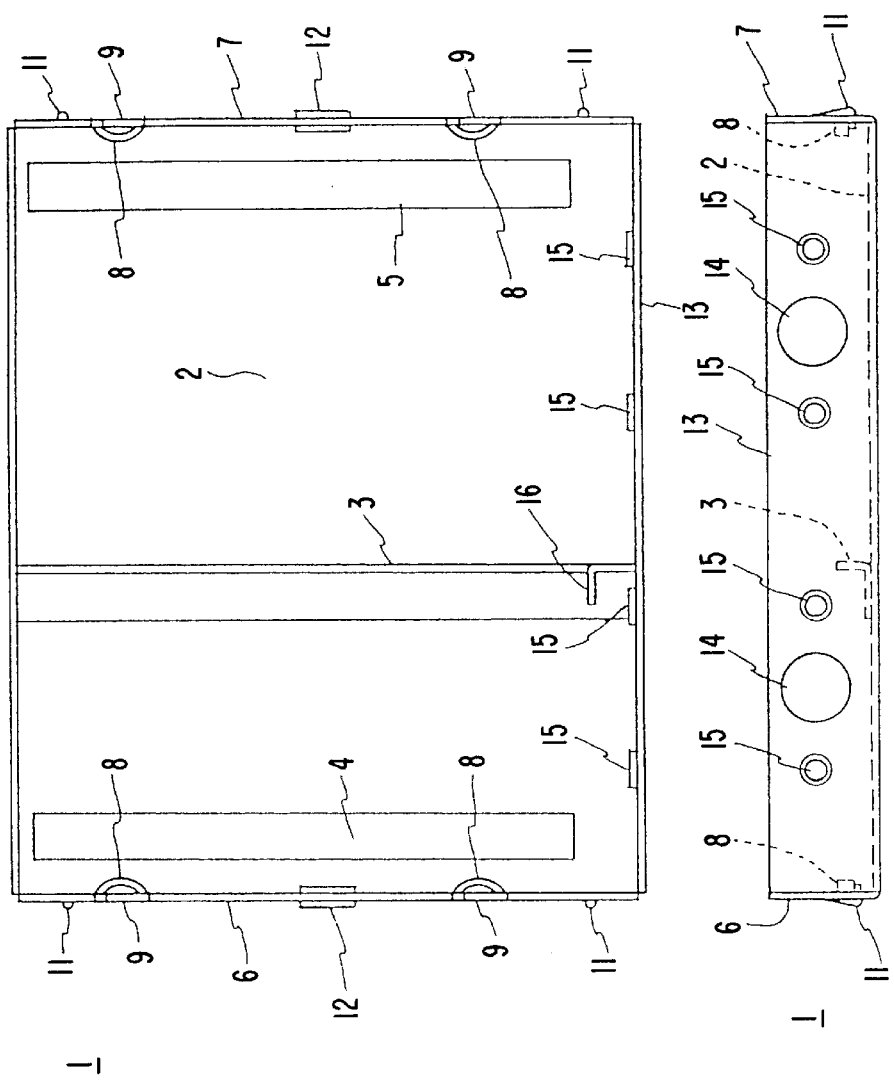

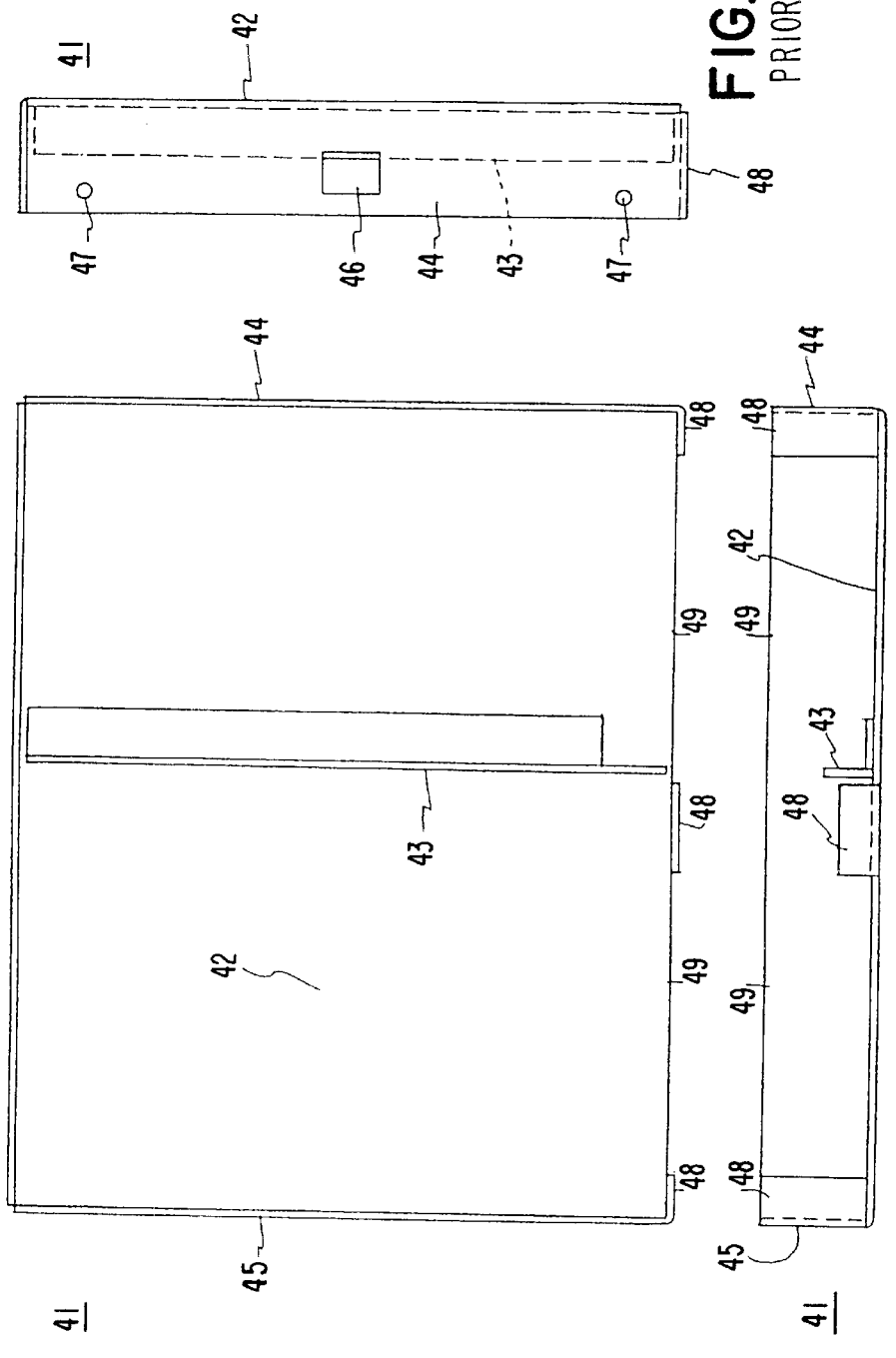

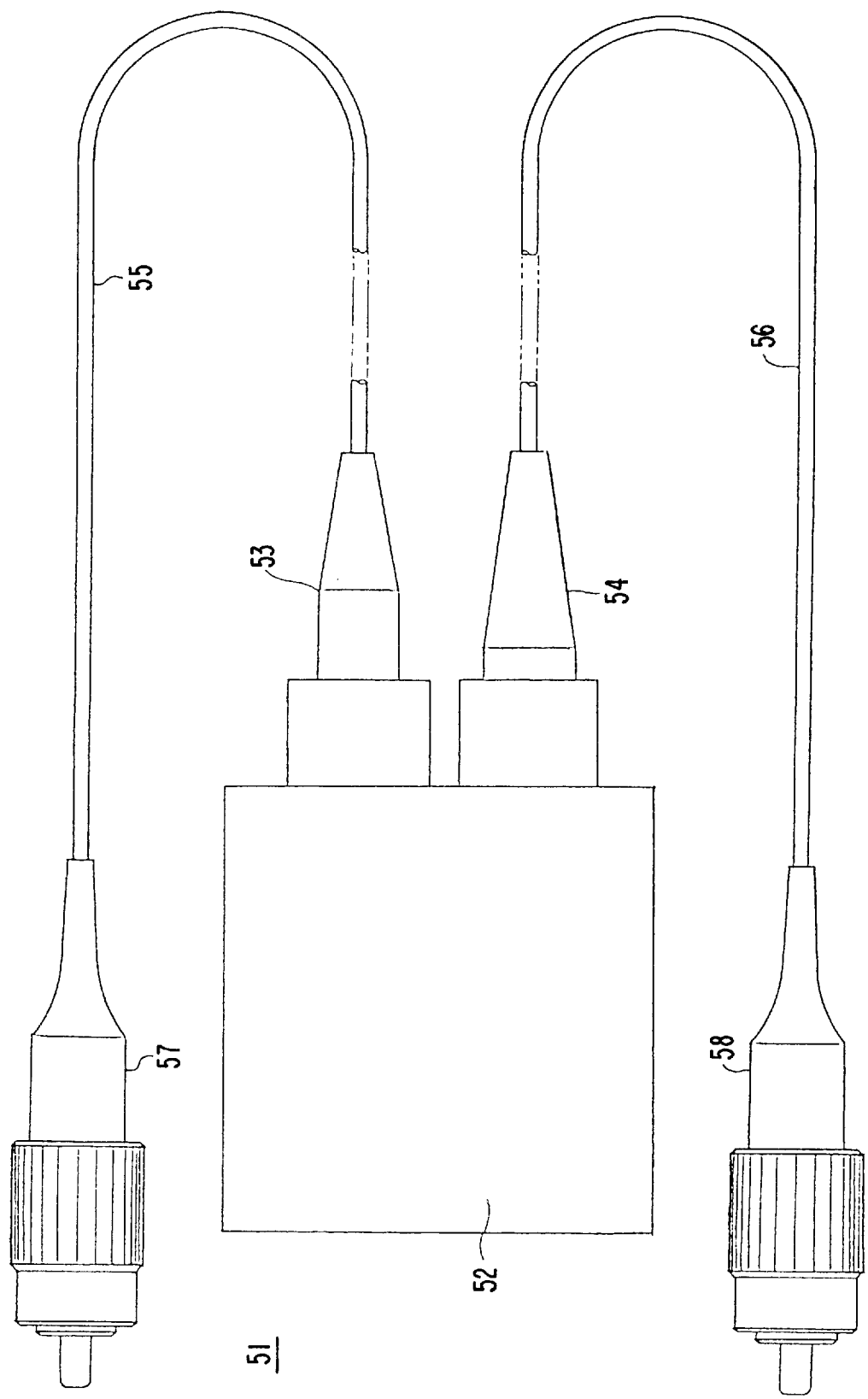

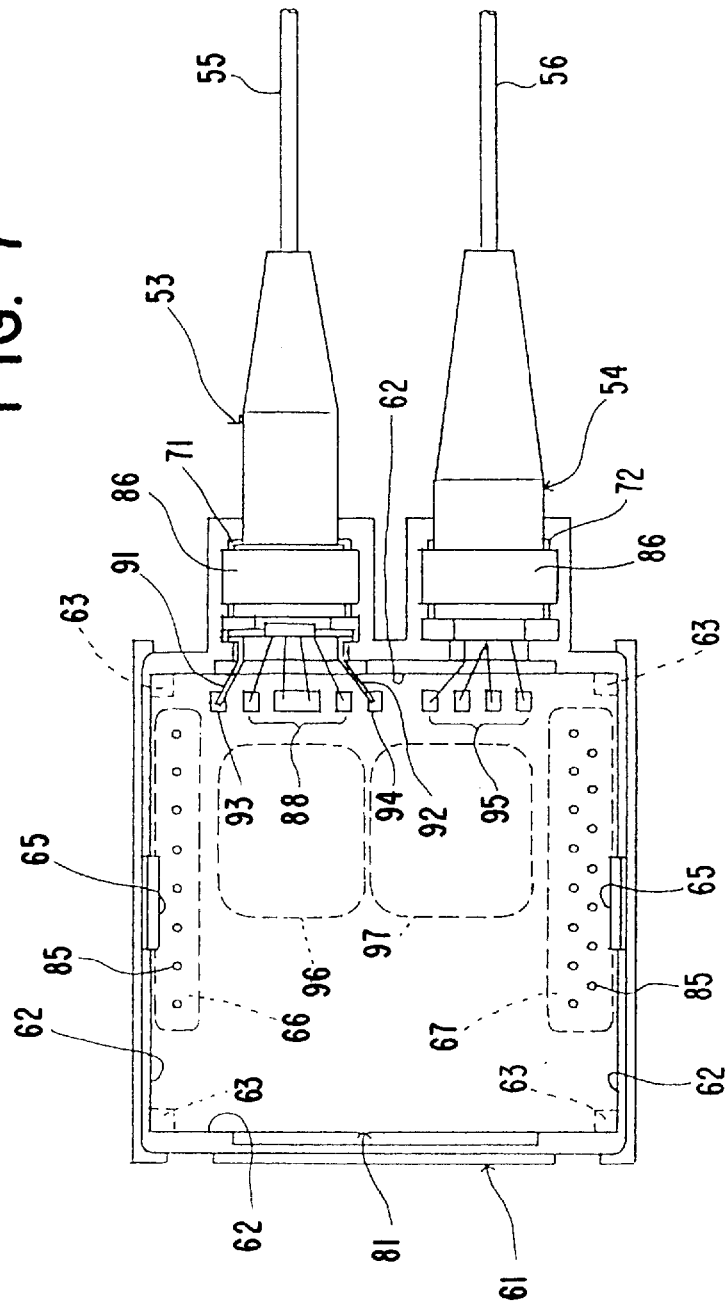

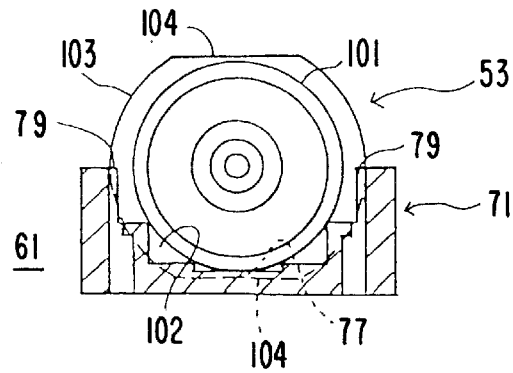
FIG. 9A
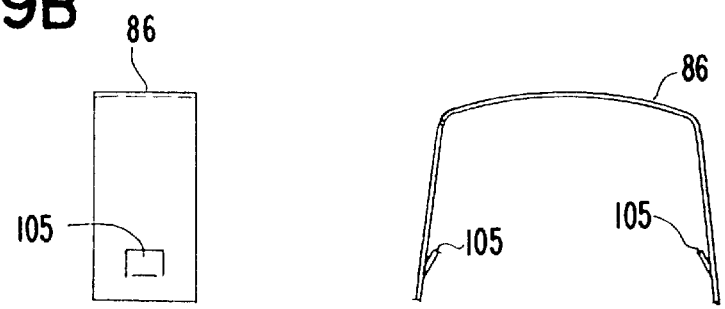
FIG. 9B
FIG. 9C
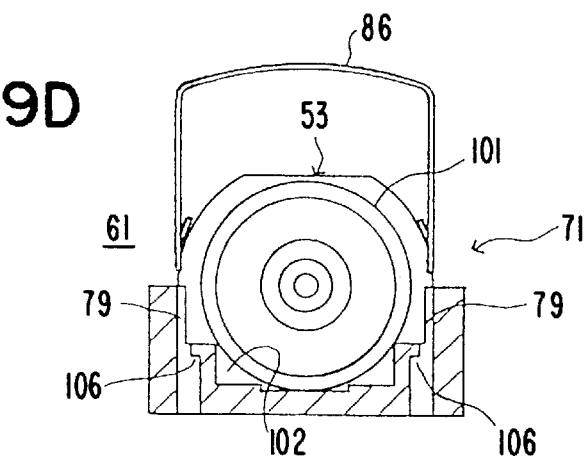
FIG. 9D
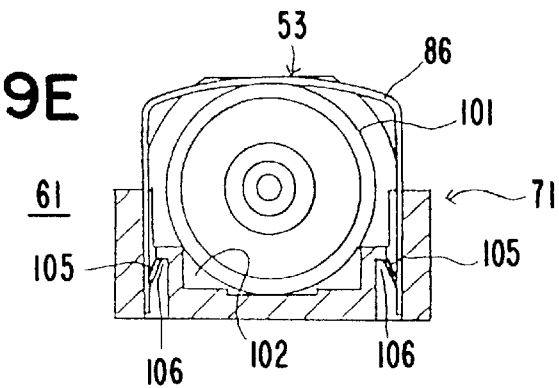
FIG. 9E

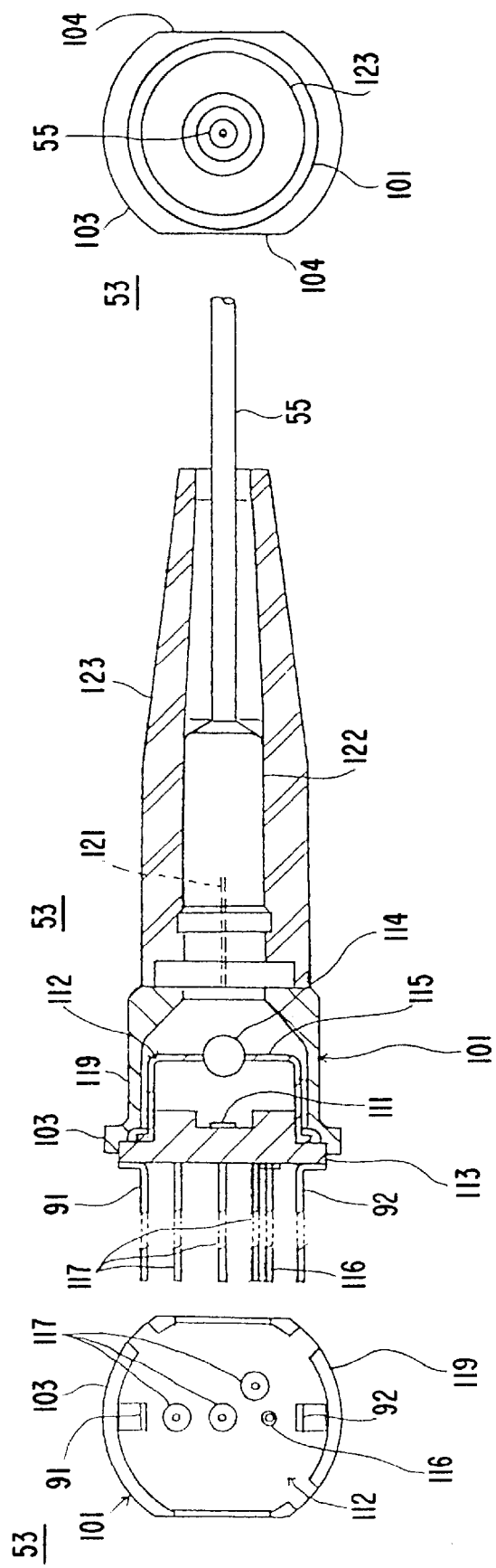
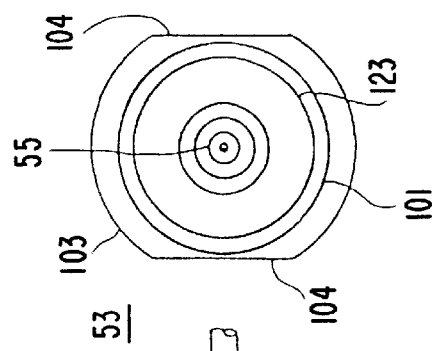

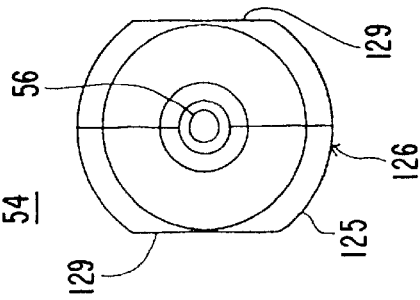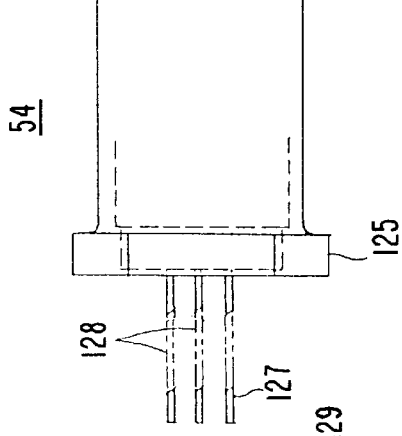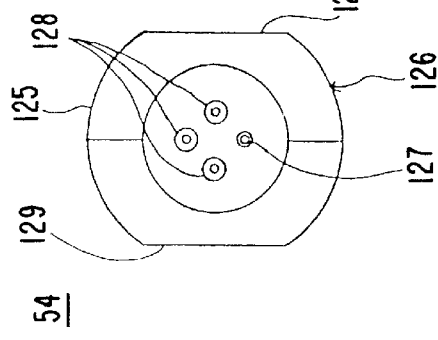

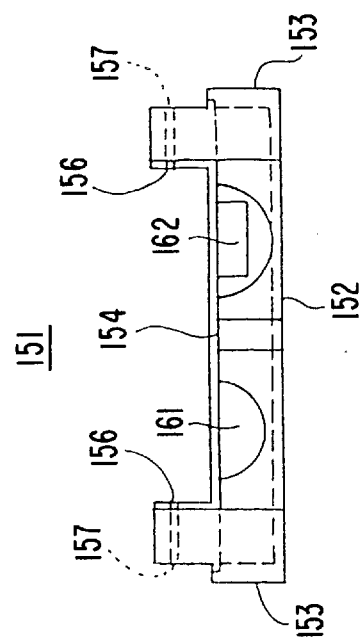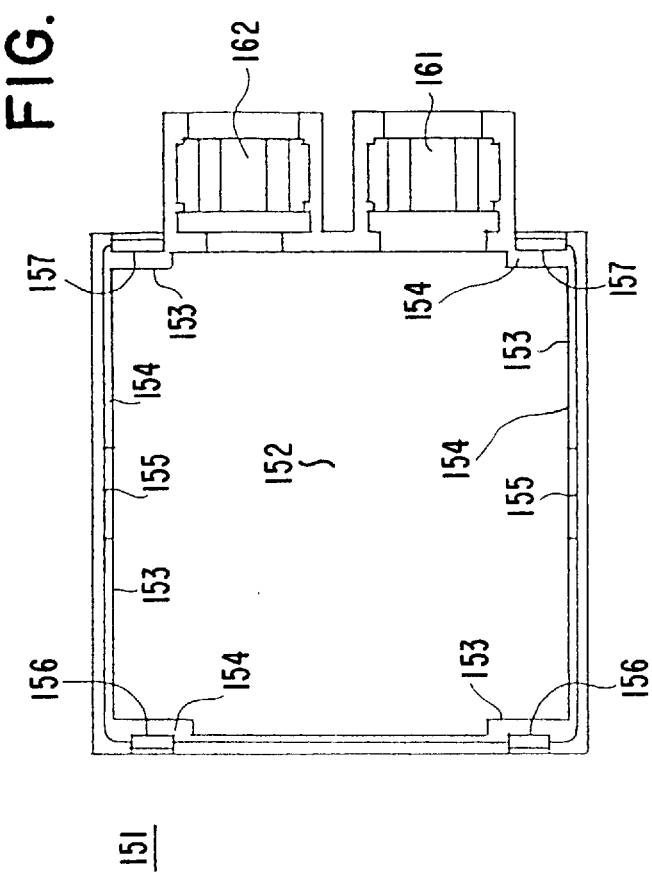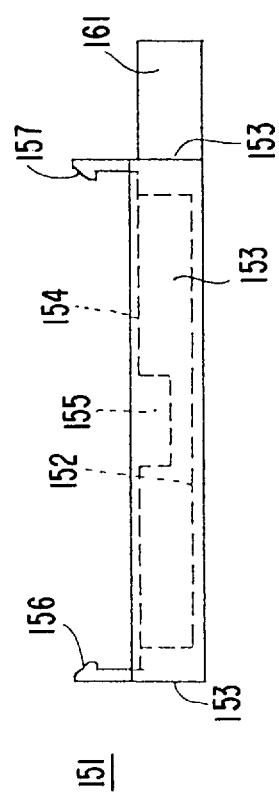

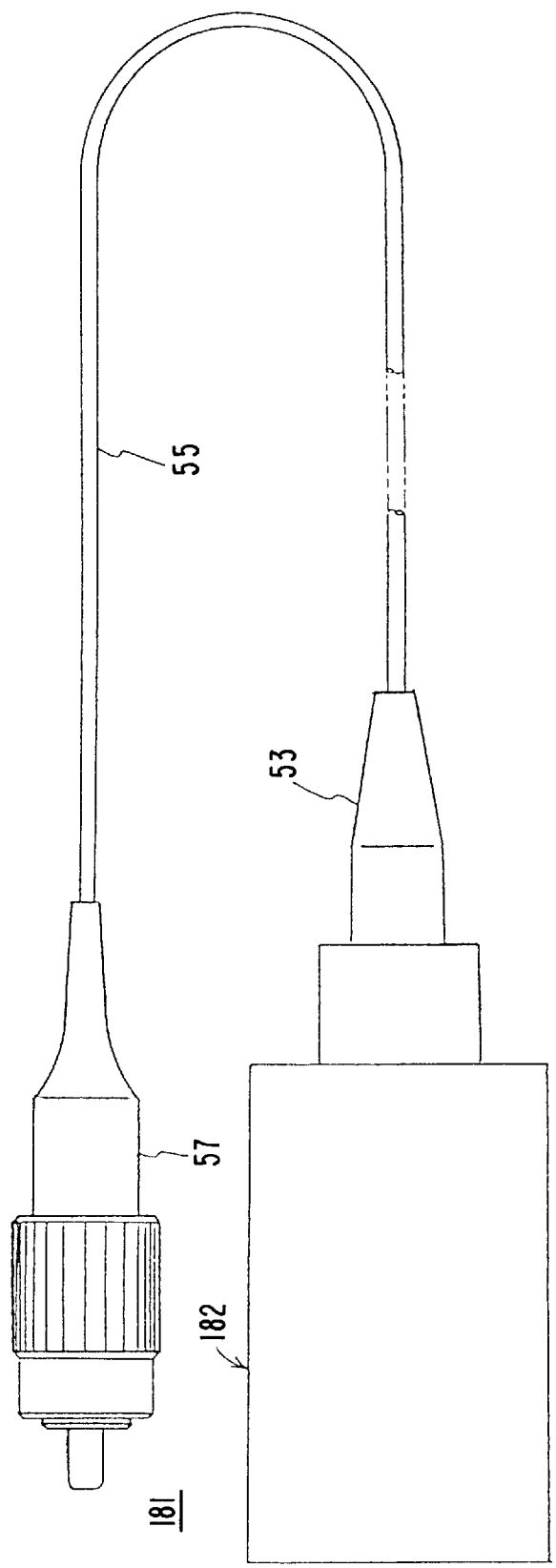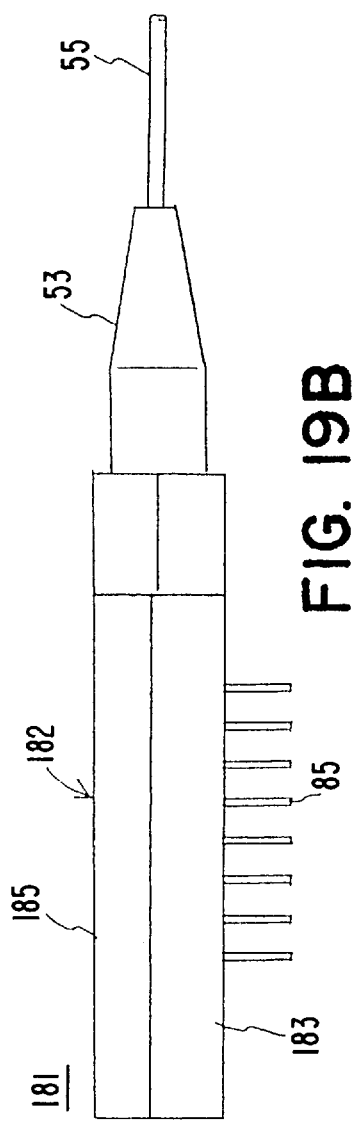
FIG. 19A
FIG. 19B

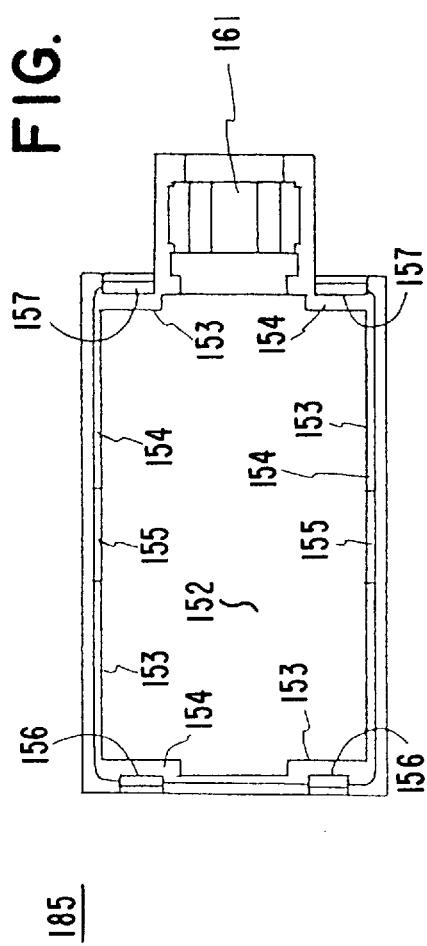
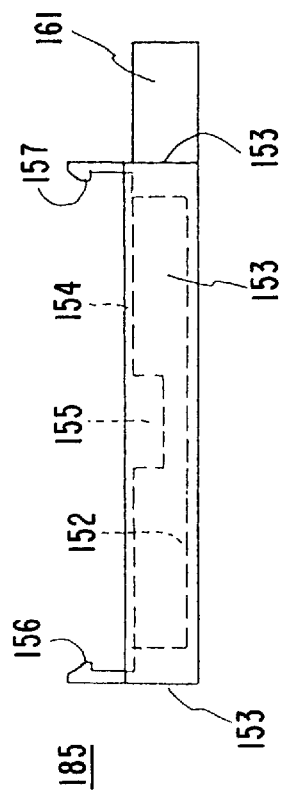
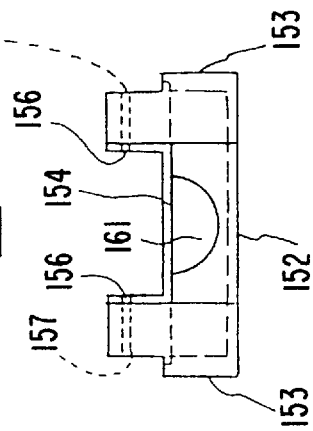

OPTICAL TRANSCEIVER UNIT

BACKGROUND OF THE INVENTION

1. Field of the Invention

The present invention relates to an optical transceiver unit used for transmitting and/or receiving an optical signal. In the field of electronics and communication, in order to transfer or interchange a great volume of information at a high speed within or between electronic equipment, an optical signal is transmitted through an optical fiber as a transmission line. An electric signal carrying information is converted into an optical signal for transmission and the optical signal is converted into an electric signal for processing the information.

Therefore, an opto-electric converter (optical receiver unit) and an electro-optical converter (optical transmitter unit) which are small-sized, high-speed, highly reliable and also easy in manufacturing and operation, are in great demand.

2. Description of the Related Art

An optical transceiver unit including the optical receiver unit and optical transmitter unit in a one-piece construction, is acknowledged as prior art.

FIGS. 1A–1C are top, front and side plan views, respectively of a casing body.

The casing body 1 is made by bending a sheet of metal along four sides there of to form a case with a bottom 2 surrounded by a wall and by welding an L-shaped metal strip 3 to the bottom 2 to form a partition wall 3a for dividing the case into left and right chambers. Rectangular holes, or slots, 4, 5 are bored in the respective chambers.

Four curved projections 8 are extended and extend inwardly, two each from right and left sidewalls 6, 7 close to the bottom 2, to position and support a printed circuit board. The upper surface of the projection 8 is equal to that of the partition 3 in height above the bottom 2. A projection strip 9 is formed by punching, at a distance equal to the thickness of the printed circuit board above each of the projections 8, thereby to have the printed circuit board inserted therebetween. Four projections 11 extrude (extend) outwardly, two each from the sidewalls 6, 7 close to the bottom 2. Projections 12 are formed in the respective centers of the side walls 6, 7 by punching and bending such that the bottom of each declines outwardly for latching a casing cover.

Corresponding to the right and left chambers formed by the partition 3, holes 14 are provided in the front wall 13, respectively for mounting an optical receiver module and an optical transmitter module therein. A bend 16 is provided on the partition wall 3a to position the front end of the printed circuit board. The casing body 1, which is made of structural sheet steel, is nickel-plated to improve conductivity and to prevent rusting.

FIG. 2 shows the casing body 1 having a printed circuit board 17, an optical receiver module 18 and an optical transmitter module 19 mounted therein.

The four-layer printed circuit board 17 is mounted such that it fits in an area enclosed by the side walls 6, 7, the rear wall of the casing body 1 and the bend 16 of the partition 3. It is supported in position on the respective upper surfaces of the projections 8 and the partition wall 3a. Then, the projections 9 of the right and left sidewalls 6, 7 are bent over the printed circuit board 17 and soldered to respective ground patterns 21 printed thereon.

For easy understanding, electronic parts mounted on the printed circuit board 17 are not shown in FIG. 2. The printed circuit board 17 has lead terminals 22 arranged in a line and projecting downwardly through the rectangular holes 4, 5, to connect to a main printed circuit board. On one side of the casing-body front wall 13, the optical receiver module 18 is fastened to a flange 24 of a metal case 23 with screws 25. The metal case 23 houses a photo diode for performing opto-electric conversion, built in a metallic container.

Wires for supplying a bias voltage to the photo diode, outputting an electric signal and outputting ground signals for the output signal and the metallic container are soldered to a connection pattern 26 printed on a side of the printed circuit board 17. An end of an optical fiber 27 is connected to the optical receiver module 18 and the other end to an optical connector 28.

On the other side of the casing-body front wall 13, the optical transmitter module 19 is fastened to a flange 32 of a metal case 31 with screws 33. The metal case 31 houses a laser diode for performing electro-optical conversion, built in a metallic container. A wire for supplying power to the laser diode and a wire for connecting to a monitor laser diode are soldered to connection patterns 34 printed on the side of the printed circuit board 17. An end of an optical fiber 35 is connected to the optical transmitter module 19 and the other end to an optical connector 36.

FIGS. 3A–3C are inside, front and side plan views, respectively of a casing body.

The casing cover 41 is made by bending a sheet metal along the four sides there of to form a case surrounded by a wall. An L-shaped metal strip is welded to an upper surface 42 to form a partition wall 43a dividing the case into two components. Rectangular holes 46 are bored in the respective centers of the right and left sidewalls 44, 45. Two holes 47 are bored at the respective front and rear edges of the sidewalls 44, 45 close to the aperture (i.e., top opening) of the case. A gap 49 is provided on the right and left sides of the front wall segments, 48. The casing cover 41, which is made of the structural sheet steel board, is nickel-plated for finishing to improve conductivity and to prevent rusting.

FIG. 4A is front plan view of an assembly of the conventional optical transceiver unit (optical connecters 28, 36 not shown). FIG. 4B is a front sectional view of an assembly of the conventional optical transceiver unit.

In FIG. 4A, the casing cover 41 fits on the the casing body 1 to cover its opening. The optical receiver module 18 and optical transmitter module 19 within the gaps 49 provided on the front side of the casing cover 41.

In FIG. 4B, the projection strips 12 provided on both of the casing-body sidewalls 6, 7 fit in the rectangular holes 46 provided on the casing-cover sidewalls 44. A flat surface of the rectangular hole 46 engages with a side of the projection 12 to prevent the casing cover 41 from coming off the casing body 1. The projections 11 provided on the casing-body sidewalls 6, 7 fit in the front and rear holes 47 of the casing-cover sidewalls 44, 45 to prevent backlash and reenforce electric contact between the the casing body 1 and casing cover 41. Since the casing-body partition wall 3a and casing-lid partition 42 electrically isolate the right and left chambers, each accommodating the optical transmitter circuit and optical receiver circuit mounted on the printed circuit board 17, electromagnetic interference between the circuits is reduced.

In each chamber, a resin-covered IC bear chip is mounted under the printed circuit board 17. On a side of each compartments, lead terminals 22 project downwardly for connecting the optical transceiver unit to a main printed-circuit board. In the conventional optical transceiver unit as described above, the casing body 1 and the casing cover 41 are both made of sheet metal and to mount the optical receiver module 18 and optical transmitter module 19, the flanges 24, 32 are provided and fastened to the casing body with screws 25, 33.

Therefore, it is a problem that a large area is required for mounting the modules, accordingly rendering the unit large-sized and heavy. It is another problem that a burdensome manufacturing process is required for mounting the printed circuit board 17 on the casing body 1, for example, for providing the partition 3, the projections 8 and the bend 16 for positioning the printed circuit board 17, and for bending the projection 9 and soldering the wires to the printed-circuit-board ground patterns 21.

SUMMARY OF THE INVENTION

It is an object of the present invention to provide an optical receiver unit which is small-sized, light-weight and easy in assembling. It is another object of the present invention to provide such a unit which is reliable and fail proof against electromagnetic interference.

To achieve the above and other objects, the optical receiver unit of the present invention provides an optical receiver module having an opto-electric converter contained in a metal container, a printed-circuit board having power, signal and ground terminals for connecting power, signal and ground lines to the opto-electric converter, a casing body including a board receptacle and a module receptacle respectively for accommodating the printed-circuit board and the optical receiver module, and a cover for covering the casing body.

The casing body and the cover are both molded out of synthetic resin and have at least an internal surface metallized. The cover covers the casing body so that the metallized surface of the cover contacts that of said casing body.

BRIEF DESCRIPTION OF THE DRAWINGS

FIGS. 1A–1C are top, front and side plan views, respectively of a casing body;

FIGS. 3A–3C are inside, front and side plan views, respectively of a casing body;

FIG. 5 is a top view showing the external appearance of an optical transceiver unit of the first embodiment of the present invention.

FIG. 7 shows the casing body 61 with a printed circuit board 81, optical receiver module 53 and optical transmitter module 54 mounted thereon;

FIGS. 9A–9E are traverse sectional views illustrating a process of mounting the optical receiver module 53 in the module receptacle 71;

FIG. 10A is a longitudinal sectional view of the optical receiver module 53;

FIGS. 10B and 10C are traverse sectional views of the optical receiver module 53 taken from the wire side and optical fiber side, respectively;

FIG. 11A is a longitudinal sectional view of the optical transmitter module 54;

FIGS. 11B and 11C are traverse sectional views of the optical transmitter module 54 taken from the wire side and optical fiber side, respectively;

FIGS. 14A–14C are inside, front and side plan views, respectively of a casing lid;

FIGS. 19A and 19B are top and side external views, respectively of the optical receiver unit of a third embodiment of the present invention;

FIGS. 21A–21C are inside, front and side views, respectively of a casing cover.

Throughout the above-mentioned drawings, identical reference numerals are used to designate the same or similar component parts.

DESCRIPTION OF THE PREFERRED EMBODIMENTS

An optical transceiver unit embodying the present invention is explained in detail referring to the figures.

FIG. 5 is a top view showing a external appearance of an optical transceiver unit of the first embodiment of the present invention.

Figure 2:
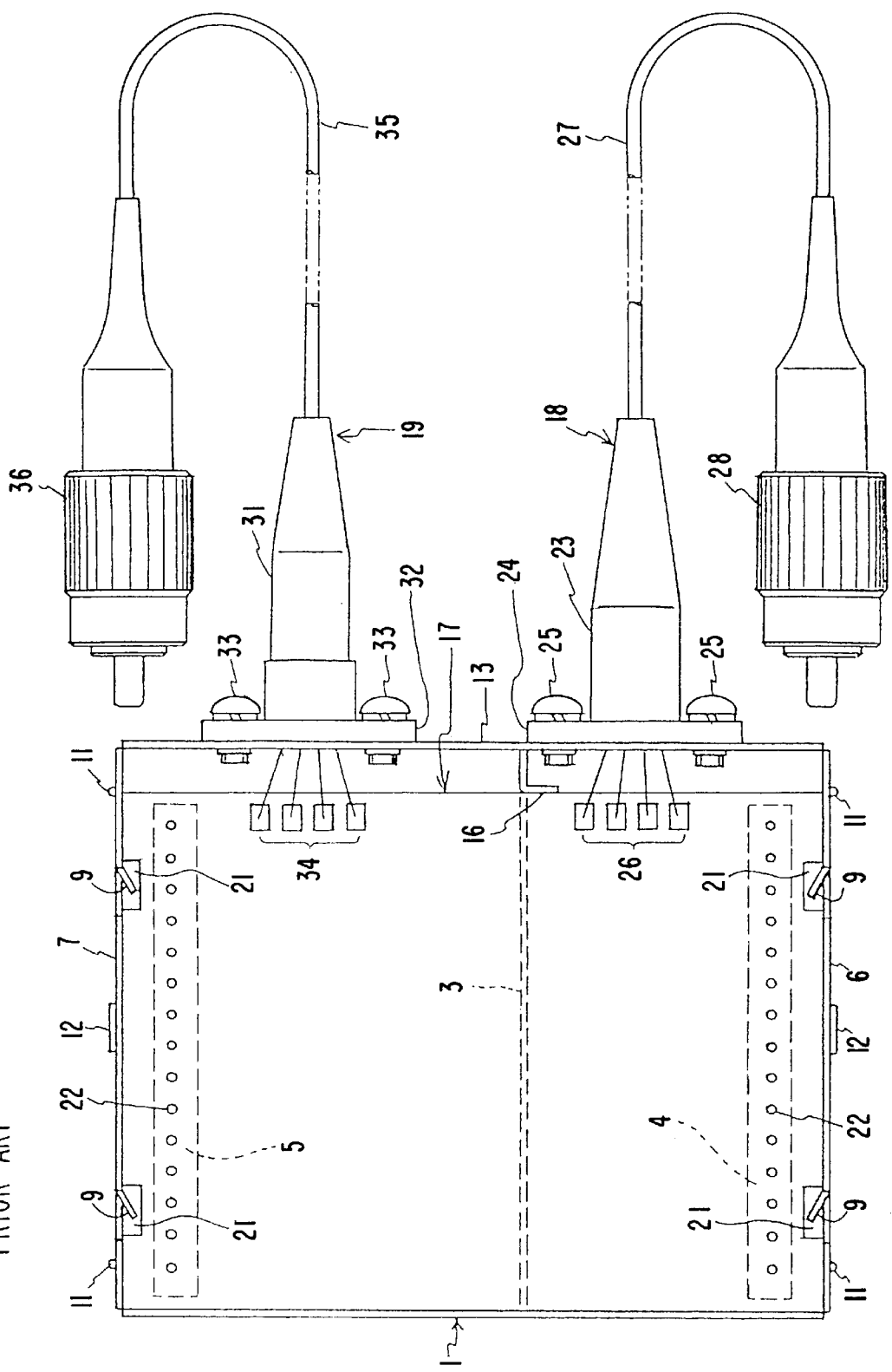
FIG. 2 shows the casing body 1 having a printed circuit board 17, an optical receiver module 18 and an optical transmitter module 19 mounted thereon.
Figure 4A:
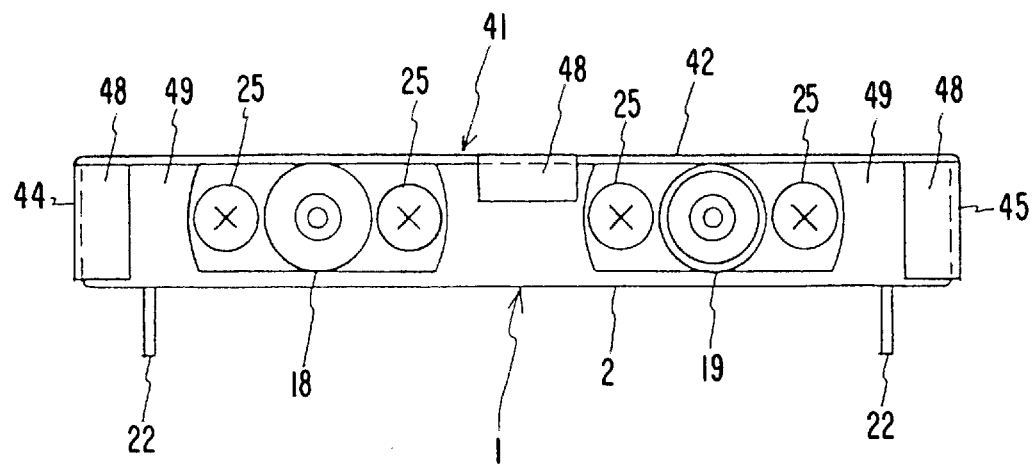
FIG. 4A is front plan view of an assembly of the conventional optical transceiver unit (optical connecters 28, 36 being not shown therein)
Figure 4B:
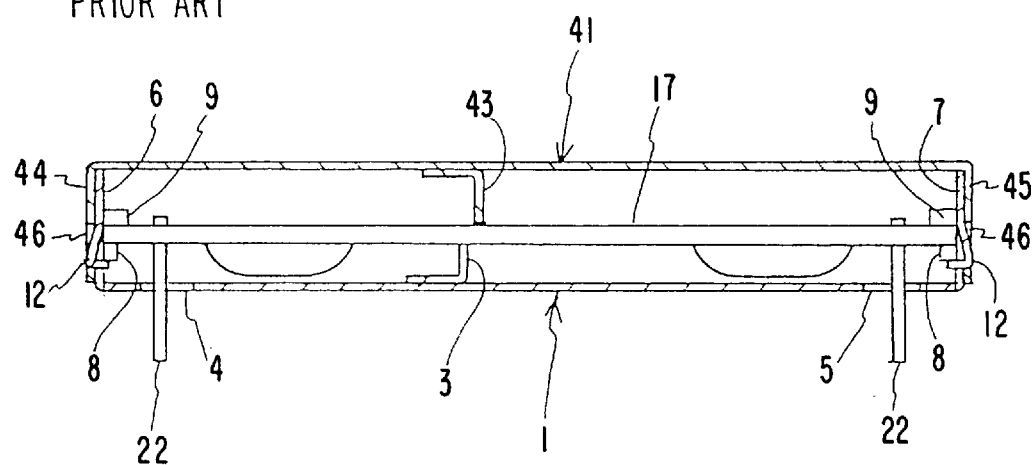
FIG. 4B is a front sectional view of the assembled conventional optical transceiver unit.
Figure 6A:
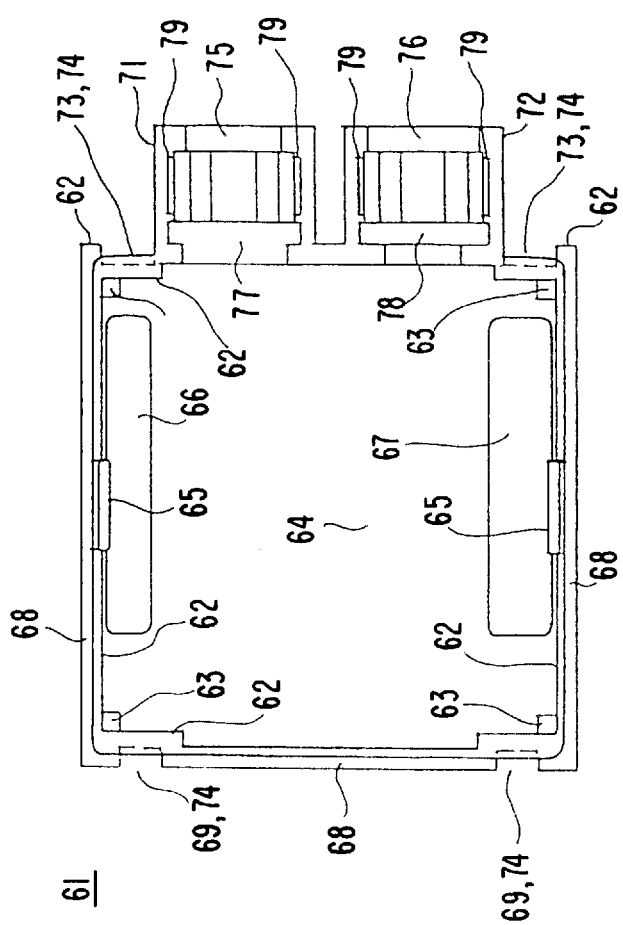
FIGS. 6A–6C are top, side and front views, respectively, of a casing body.
Figure 6C:
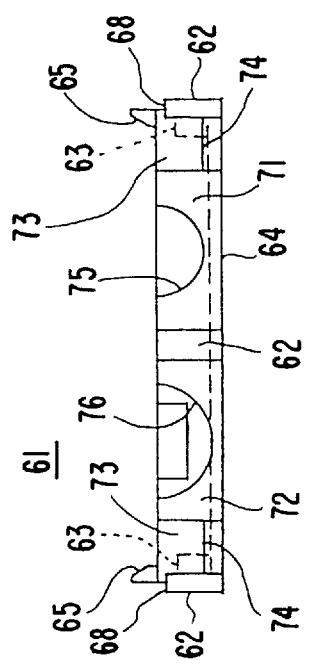
Figure 6B:
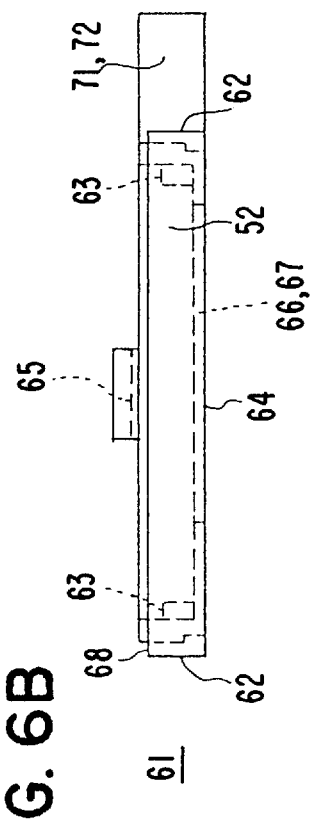

An optical receiver module 53 and an optical transmitter module 54 are housed in a main body 52 of the optical unit 51. Optical fibers 55, 56 are connected respectively at first ends thereof to the modules and at second ends thereof to optical connectors 57, 58. FIGS. 6A–6C are top, side and front views, respectively of a casing body. It is assumed in FIG. 6A that the right, left, upper, lower, reverse and obverse sides of the page are the front, rear, right, left, bottom and top sides of the unit, respectively.

The casing body 61 is molded as a one-piece construction, out of a synthetic resin having excellent moldability and strength, such as an ABS resin. The casing body 61 is shaped like a container having a base 64 surrounded by a wall 62. To mount a printed circuit board, steps 63 of a predetermined height above the base 64 are provided at four corners of the wall 62. Claws for latching the printed circuit board in position extend from the right and left walls 62.

Rectangular holes 66, 67, for letting (i.e., passing) printed-circuit-board lead terminals therethrough, are provided on the right and left sides of the base 64. The wall 62 has a step 68 cnstructed such that the inner level of the top is higher than the outer. Grooves 69 for receiving casing-cover claws are provided right and left on the outside of the rear wall 62.

Module receptacles 71, 72 for holding an optical receiver module and an optical transmitter module, respectively extend in parallel from the front wall 62. Grooves 73 for receiving casing-lid claws are provided on the wall 62 of both sides of the module receptacles 71, 72.

The grooves 69, 73 each have a recess 74 formed at their bottoms on the casing-body base 64. The module receptacles 71, 72 are provided with semicircular recesses 75, 76 where the respective module external forms fit collar-holding recesses 77, 78 and clamp-insertion holes 79.

The so-constructed casing body 61 is metallized on the whole surface through a process, for example, of electroless plating, copper plating and nickel-plating for glossy finishing.

FIG. 7 shows the casing body 61 with the printed circuit board 81, optical receiver module 53 and optical transmitter module 54 mounted thereon.

The multi-layer (4- or 8-layer) printed circuit board 81 fits in an area (board receptacle) formed by the casing-body wall 62, with the reverse side placed on steps 63 at the four casing-body corners and with the right and left sides inserted under the claws 65. Since the printed circuit board 81 contacts the upper surface of the steps 63 at the four corners, the ground patterns printed on the four reverse-side corners thereof contact the metallized surface of the casing body 61 via the upper surfaces of the steps 63, thus grounding the metallized casing-body surface.

For easy understanding, electronic parts mounted on the printed circuit board 81 are not shown in FIG. 7. The printed circuit board 81 has lead terminals 85 for connecting to a main printed-circuit board on which the optical transceiver unit is mounted, extending downward through the casing-body rectangular holes 66, 67, with a group of lead terminal 85 arranged in line on the right side at a predetermined pitch and the others arranged zigzag on the left side at a narrower pitch.

The optical receiver module 53 is placed in the casing-body module receptacle 71 and clamped therein with a metal clamp 86. The optical transmitter module 54 is placed in the module receptacle 72 and clamped therein with a metal clamp 86. The optical receiver module 53 houses a sealed metal container incorporating a photo diode circuit for performing opto-electric conversion and a preamplifier IC for amplifying the converted electric signal, and is connected to an optical fiber 55.

Four wires from an end of the sealed metal container are soldered to respective connection patterns 88 printed on a side of the printed circuit board 81. One of the wires outputs circuit ground of the aforesaid internal circuits via the metal container. The other one outputs an electric signal through a glass terminal (not shown) provided for isolation on the end of the metal container. The other two, which are connected to a common connection terminal, respectively supply power to the preamplifier IC and supply a bias voltage to the photo diode through the glass terminals. Two additional ground wires 91, 92 are provided on both sides of the metal container in parallel with the surface of the printed circuit board 81 and soldered to ground patterns 93, 94, to reinforce the capability of optical receiver module 53 to stand electromagnetic interference.

The optical transmitter module 54 houses a sealed metal container having a laser diode circuit for performing electro-optical conversion built therein and is connected to an optical fiber 56. Four wires from the sealed metal container are soldered to respective connection patterns 95 printed on a side of the printed circuit board 81. One of the wires outputs circuit ground from the internal circuit via the metal container. The other one supplies power to the laser diode and the other two connect to a monitor laser diode, all through the glass terminals (not shown).

A received signal processing LSI chip 96 and a transmitting signal processor LSI chip 97 are resin-sealed on the under surface of the printed circuit board 81 in the respective areas enclosed in dotted lines in FIG. 7.

Figure 8A:
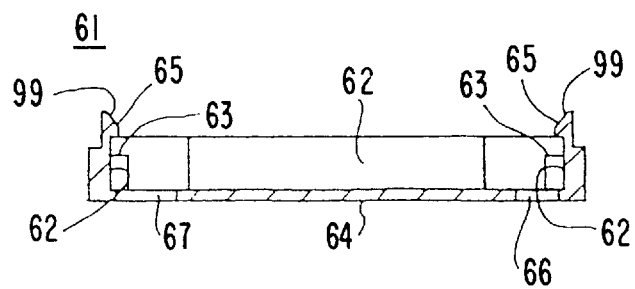
FIGS. 8A–8C are traverse sectional views illustrating a process of mounting the printed circuit board 81 in the casing body 61.
Figure 8B:
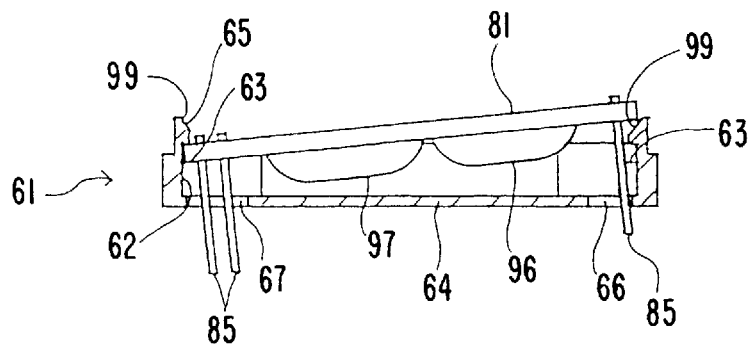
Figure 8C:
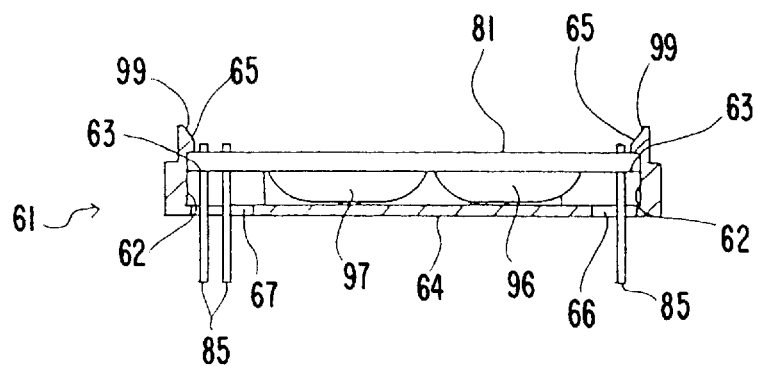

FIGS. 8A–8C are traverse sectional views illustrating a process of mounting the printed circuit board 81 in the casing body 61.

The claws 65 provided on top of the right and left sidewalls 62 overhang the inside of the sidewalls 62 and have sloped surfaces 99, descending inwardly formed on top.

As shown in FIG. 8B, a group of lead terminals 85 provided on a side of the printed circuit board 81 are inserted into the rectangular hole 67 in the bottom (wall) 64. The side of the printed circuit board 81 is inserted between the steps 63 and the claws 65. The other side of the printed circuit board 81 is applied on the slopes 99 of the claws 65 with the other group of lead terminals 85 inserted in the rectangular hole 66. Then, the printed circuit board 81 is pressed down at the edge portion thereof touching the slope 99. The above pressing down elastically-deforms the claws 65 and sidewalls 62, causing them to bend outwardly and allowing the printed circuit board 81 to pass through the claws 65. As a result, the printed circuit board 81 is inserted under the claws 65 and settled on the steps 63, thus being accommodated in the board receptacle as shown in FIG. 8C.

The above mounting process may be modified by pressing down the printed circuit board 81 at both ends while keeping it in parallel with the casing-body bottom 64, accordingly elastically-deforming both claws 65 and accommodating it in the board receptacle with a single stroke.

The process of mounting the optical receiver module 53 in the module receptacle 71 is explained referring to FIGS. 9A–9D the process for the optical transmitter module 54 is basically the same as that for the optical receiver module 53. FIGS. 9A–9D are traverse sectional views illustrating a process of mounting the optical receiver module 53 in the module receptacle 71. When the optical receiver module 53 is mounted in the module receptacle 71, as shown in FIG. 9A, a metallic module main body 101 settles in a module-receiving recess 102 and the collar 103 settles in the collar-receiving recess 77.

The collar 103, whose diameter is larger than that of the module main body 101, has upper and lower flats 104 formed in parallel with each other. The flats 103 reduce the size of the optical transmitter unit. The lower flat 103 settles the module main body 101 stably in a module-receiving recess 102 and prevents it from rotating because it contacts with the bottom of the collar-receiving recess 77.

The metal clamp 86 is made by bending a nickel-plated sheet metal (e.g., stainless sheet steel, white metal plate or phosphorus bronze sheet) in a reversed U shape and providing claws 105 extending upward and inward at each end of the legs. The legs of the clamp metal 86 are inserted vertically into the holes 79 as shown in FIG. 9D. The width of the hole 79 is made larger than the thickness of the metal clamp 86 but smaller than the total thickness including the claw. The hole 79 has a wide area (cavity 106) formed toward the bottom of the module receptacle 71. Therefore, pressing down the clamp metal 86 elastically-deforms the claws 105 to force them into the holes 79 and to contact the clamp-metal legs with the module main body 101. Further depressing elastically-deforms both the clamp-metal legs to insert them deep into the holes 79.

The claw 105 passes through the hole 79 while being contracted and engages the cavity 106 when it expands by an elastic restoring force. Thus, the module main body 101 is pressed and fastened to the module-receiving recess 102 by the elastic restoring force of the clamp-metal legs. The module main body 101 being fastened to the module-receiving recess 102 establishes an electrical connection between the former and the latter's metallized surface. The claws being pressed to the clamp-metal inner surface establishes an electrical connection between the former and the latter's metallized surface, accordingly establishing an electrical connection between the metal clamp and the module main body 101.

FIG. 10A is a longitudinal sectional view of the optical receiver module 53. FIGS. 10B and 10C are traverse sectional (and elevational) views of same taken from the wire side and optical fiber side, respectively. The optical receiver module 53 houses a metal container 112 having a photo diode circuit 111 and a preamplifier integrated circuit (not shown) mounted on its base 113. The circuits are sealed up by a cap 115 which has a lens 114 built in.

One of four wires from the sealed metal container 112 outputs circuit ground via the metal container 112. The other three respectively supply a bias voltage to the preamplifier IC, supply a bias voltage to the photo diode 111 and output an electric signal through the glass terminals (not shown). A pair of ribbon ground wires 91, 92 welded to the base 113, are wired on both sides of the wires 116, 117.

The metal container 112 is accommodated in cylindrical metal fitting 119 having a collar 103 at an end thereof. The metal fitting 119 and the metal container 112, whose external surface is welded to the metal fittings 119, constitute the module main body 101. An optical fiber holder (ferrule) 122 for holding the optical fiber core wire 121 therethrough is arranged on the side opposite to the photo diode 111 with respect to the lens 114 and its brims are welded to a side of the metal fittings 119. The optical fiber holder 122 is covered with a protective rubber tube 123.

The thus-constructed optical receiver module 53 is accommodated in the module receptacle 71 as shown in FIGS. 9A–9E, and is connected to the printed circuit board 81 as shown in FIG. 7.

FIG. 11A is a longitudinal sectional view of the optical transmitter module 54. FIGS. 11B and 11C are traverse sectional (and elevational) views of same taken from the wire side and optical fiber side, respectively.

The optical transmitter module 54 houses a sealed metal container 126, similar to that of the optical receiver module 53 and having a laser diode and a monitor photo diode built therein and which is connected to the optical fiber 56. The metal container 126 is enclosed by a cylindrical container 126 having a collar 125 formed thereon. The cylindrical container 126 is made of two semicircular (i.e., in cross-section) synthetic-resin halves fused together or bonded together with an adhesive along the vertical lines shown in FIGS. 11B and 11C.

One (127) of three wires from the metal container 112 outputs a circuit ground via the metal container 112. The other two (128) respectively supply power to the laser diode and connect to the monitor photo diode through the glass terminals (not shown).

The collar 125 has upper and lower flats 129 formed in parallel with each other so that it is settled stably in a collar-receiving recess 78 (see FIG. 7) of the module receptacle 72. The optical transmitter module 54 is accommodated in the module receptacle 72 (see the description of FIGS. 9A–9E) and connected to the printed circuit board 81 in the same way as the optical receiver module 53.

Figure 12A:
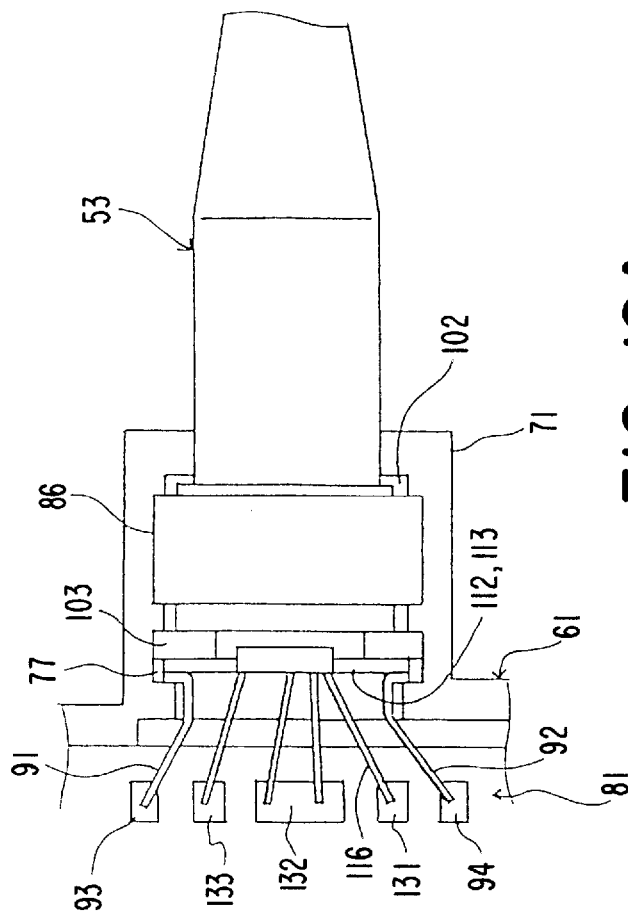
FIG. 12A is a plan view of a connection between the optical receiver module 53 and printed circuit board 81.
Figure 12B:
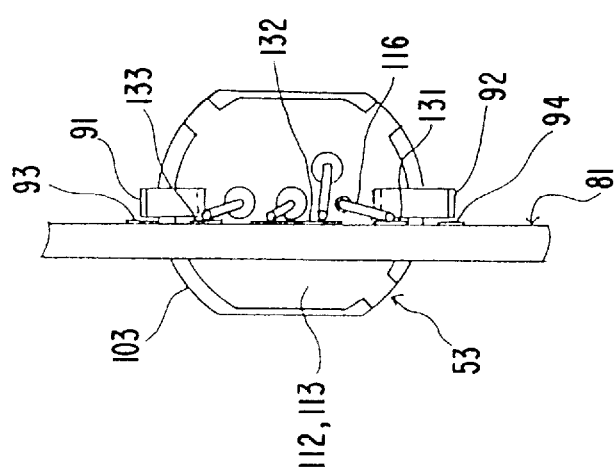
FIG. 12B is a side view of the connection between the optical receiver module 53 and printed circuit board 81 taken from the wire side.

FIG. 12A is a plan view of a connection between the optical receiver module 53 and printed circuit board 81. FIG. 12B is a side view of same taken from the wire side. As described above, the optical receiver module 53 is placed in the casing-body module receptacle 71 and fastened with the metal clamp 86. Also, it is accommodated stably in position with the collar 103 settled in the collar-receiving recess 77.

The ground wire 116 for outputting circuit ground from the internal circuits via the metal container 112 is soldered to the connection pattern 131 of the printed circuit board 81. The power wire for supplying power to the preamplifier IC and the power wire for supplying a bias voltage to the photo diode are both soldered to a common power connection pattern 132. The wire for outputting an electric signal is connected to a signal connection pattern 133. A pair of the ribbon ground wires 91, 92 from the metal-container base 113 are connected to the respective ground connection patterns 93, 94 printed on both sides of the connection patterns 131, 132, 133 of the printed circuit board 81.

In order not to be influenced on the signal detecting ability, the conventional optical receiver module, which did not take such grounding measures as mentioned above, had to be spaced apart from a source of electromagnetic interference by approximately 2 meters. However, the inventors have confirmed by experiment that the optical receiver module 53 of the present invention need only be apart from the source by approximately 70 centimeters. They have also confirmed that two ground wires 91, 92 provided on both sides of the metal container 112 can achieve more effect than only one can and that providing more ground wires at appropriate places is more effective.

Figure 13A:
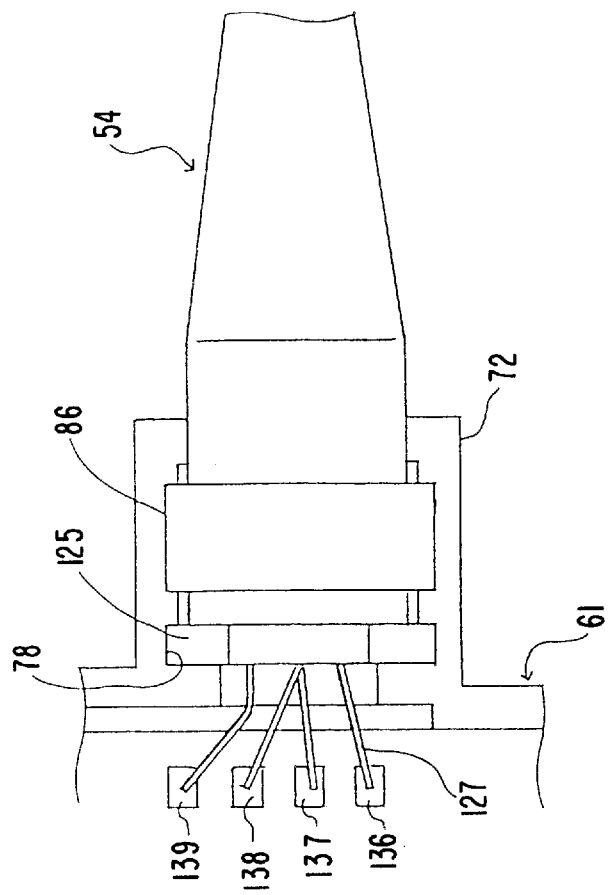
FIG. 13A is a plan view of a connection between the optical transmitter module 54 and the printed circuit board 81.
Figure 13B:
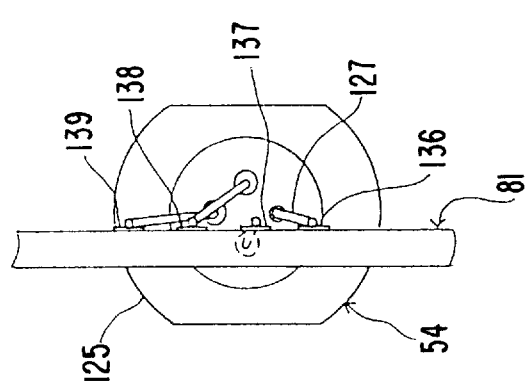
FIG. 13B is a side view of the connection between the optical transmitter module 54 and the printed circuit board 81, taken from the wire side.

FIG. 13A is a plan view of a connection between the optical transmitter module 54 and printed circuit board 81. FIG. 13B is a side view of same taken from the wire side. As described above, the optical transmitter module 54 is placed in the casing-body module receptacle 72, fastened with the clamping metal 86. It is accommodated stably in position with the collar 125 settled in the collar-receiving recess 78.

The ground wire 127 for outputting circuit ground from the internal circuits via the metal container 117 is soldered to the printed-circuit-board connection pattern 136. The wire for supplying power to the laser diode is soldered to the power connection pattern 137. The wires for connecting to the monitor photo diode are soldered to patterns 138, 139.

FIGS. 14A–14C are inside, front and side plan views, respectively of a casing lid. It is assumed in FIG. 14A that the right, left, upper, lower, reverse and obverse sides of the page are the front, rear, right, left, top and bottom sides of the module, respectively.

The casing cover 151 is molded as a one-piece construction, out of such synthetic resin having excellent moldability and strength as ABS resin. It is shaped like a container having the top plate 152 surrounded by a wall 153. The wall 153 has a step 154 formed on top where the inner brim is lower than the outer and has right and left recesses 155 in the middle for receiving the casing-body claws 65. Claws 156 and 157 are provided on the front- and rear-sides wall 153, at positions where they engage the casing-body grooves 69 and 73, respectively.

An optical receiver module receptacle 161 and an optical transmitter module receptacle 162 extend in parallel from the front-side wall, with each of the bottoms being as deep as the level of the step 154. These module receptacles 161, 162, which are almost symmetric to those (71, 72) of the casing body 61, cover the optical receiver and transmitter modules accommodated in the casing body 61.

The so-constructed casing cover 151 is metallized on the whole surface thereof through a process, for example, of electroless plating, copper plating and nickel-plating for glossy finishing.

Figure 15A:
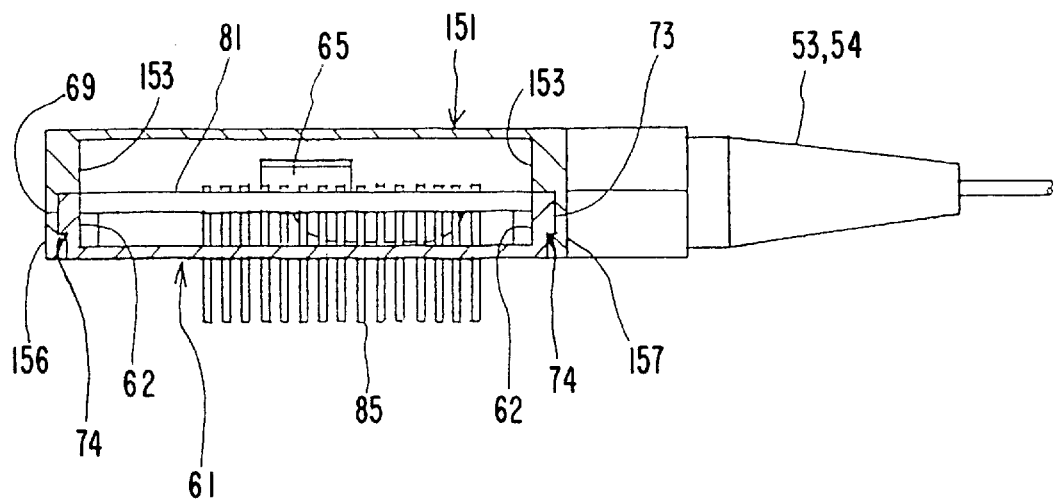
FIG. 15A is a longitudinal sectional view of the assembled optical transceiver unit, with both the rear- and front-side claws 156, 157 latched with the casing-body grooves 69 and 73, respectively.
Figure 15B:
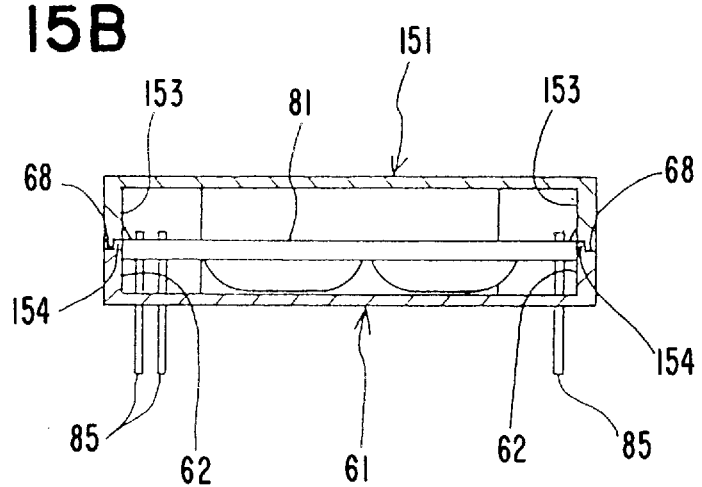
FIG. 15B is a traverse sectional view of the assembled optical transceiver unit, with both the rear- and front-side claws 156, 157 latched with the casing-body grooves 69 and 73, respectively.

FIG. 15A is a longitudinal sectional view of the assembled optical transceiver unit, with both the rear- and front-side claws 156, 157 latched with the casing-body grooves 69 and 73, respectively. FIG. 15B is a traverse sectional view of same.

The printed circuit board 81, optical receiver module 53 and optical transmitter module 54 are mounted in the casing body 61 and the wires are soldered to the connection patterns as shown in FIG. 7. Then, the casing cover 151 is positioned on the casing body 61 with the claws 156, 157 extending downwardly (see FIGS. 14A–14C) so that they align with the casing-body grooves 69, 73, respectively. In this state, pressing down the casing cover 151 inserts the claws 156, 157 into the grooves 69, 73 with the claws 156, 157 elastically-deforming outwardly. When the bottom of the casing-cover wall 153 touches the top of casing-body wall 62, the tips of the claws 156, 157 elastically-restore to engage with the recesses 74 of the grooves 69, 73 as shown in FIG. 15A.

FIG. 15 B shows the state in which the brim of the casing-cover wall 153 touches the step 68 of casing-body wall 62 and the brim of the casing-body wall 62 comes close to the step 154 of the casing-cover wall 153. Thus, the casing-body metallized surface electrically connects to the casing-cover metallized surface and isolates the circuits included therein from the outside. Also, the claws 156, 157 electrically connect to the recesses 74.

The optical transceiver unit of the second embodiment of the present invention is explained below referring to FIGS. 16A–18B.

Figure 16D:
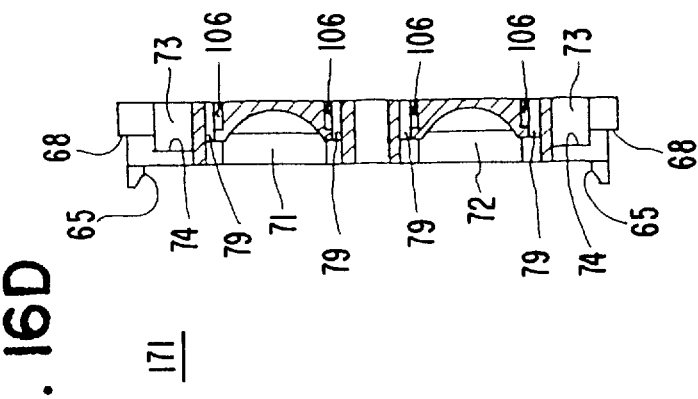
FIG. 16D is a sectional view taken along the line 16D—16D of FIG. 16A.
Figure 16C:
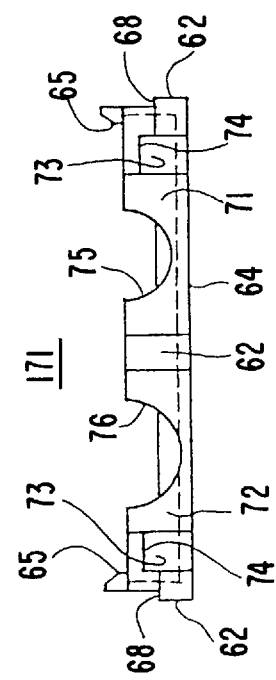
FIGS. 16A–16C are top, side and front views, respectively, of a casing body.
Figure 16A:
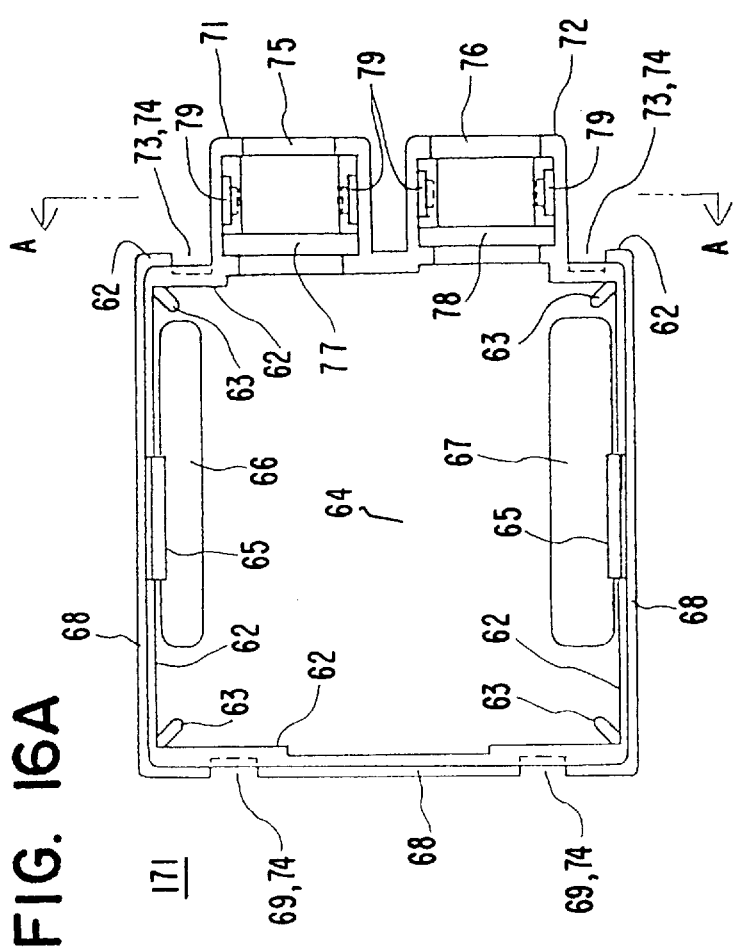
Figure 16B:
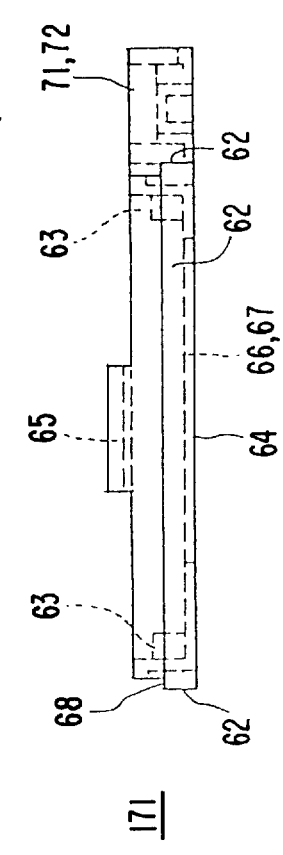

FIGS. 16A–16C are top, side and front views, respectively of a casing body. FIG. 16D is a sectional view taken along the line A—A of FIG. 16A. It is assumed in FIG. 16A that the right, left, upper, lower, reverse and obverse sides of the page are the front, rear, right, left, bottom and top sides of the module, respectively.

The casing body 171 is molded as a one-piece construction, out of a synthetic resin having excellent mold- ability and strength such as ABS resin. The casing body 171 is shaped like a container having a base surrounded by a wall 62. For mounting a printed circuit board, steps 63 of predetermined height above the base 64 are provided at the four corners of the wall 62. Claws 65 for latching the printed circuit board in position are provided on the right and left walls 62. Rectangular holes 66, 67 for letting (i.e., passing) printed-circuit-board lead terminals therethrough are provided on the right and left sides of the base 64.

The wall 62 has a step 68 formed on top edge thereof whereby the inner brim is higher than the one. Grooves 69 for receiving casing-lid claws are provided on the outer parts of the rear-side wall 62. Module receptacles 71, 72 for holding an optical receiver module and an optical transmitter module, respectively are arranged in parallel on the front-side wall 62. Grooves 73 for receiving casing-cover claws are provided on both sidewalls of the wall 62.

In this embodiment, recesses 74 are provided in the respective grooves 69, 73 at places higher than the steps 69 of the wall 62. Thus, in the casing body 61 of this embodiment, the distance between the top of the wall 62 and the step 68 is larger than that in the first embodiment. The module receptacles 71, 72, which are different in size, are provided respectively with semicircular recesses 75, 76 where the respective modules fit, collar-holding recesses 77, 78 and clamp-inserting holes 79.

The so-constructed casing body 171 is metallized on the whole surface through a process, for example, of electroless plating, copper plating and nickel-plating for glossy finishing.

Figure 17A:
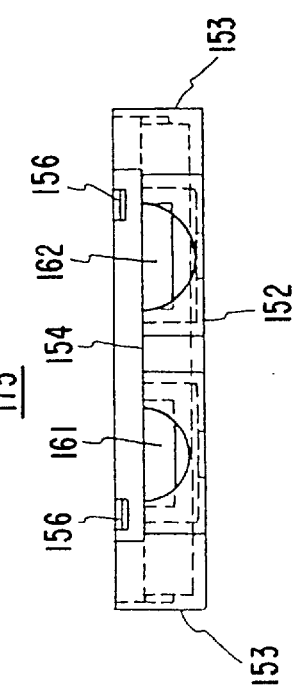
FIGS. 17A–17C are inside, front and side views, respectively of a casing cover.
Figure 17B:
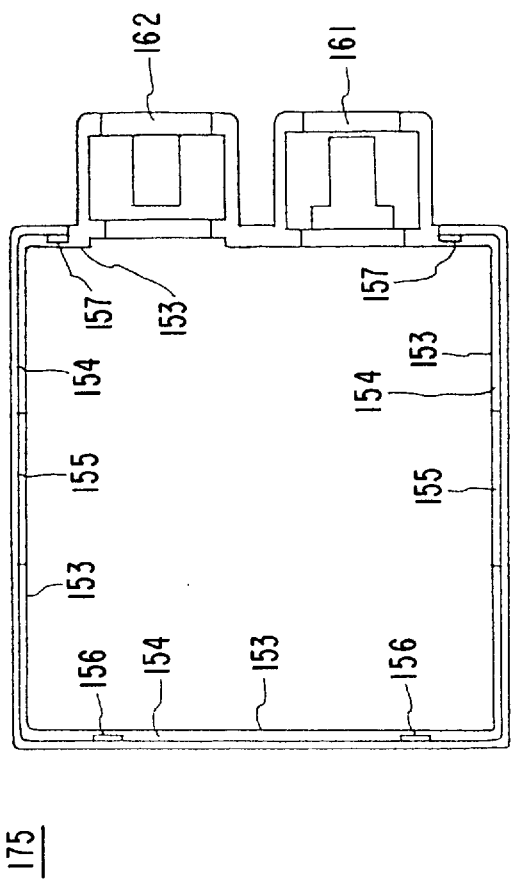
Figure 17C:
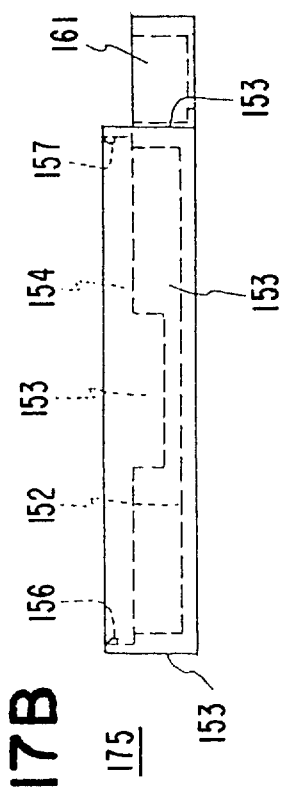

FIGS. 17A–17C are inside, front and side views, respectively of a casing cover. It is assumed in FIG. 17A that the right, left, upper, lower, reverse and obverse sides of the page are the front, rear, right, left, top and bottom sides of the module, respectively.

The casing cover 171 is molded as a one-piece construction, out of such synthetic resin having excellent moldability and strength as ABS resin. The casing body 171 is shaped like a container having a top 152 surrounded by a wall 153. The wall 153 has a step 154 formed on top, where the inner brim is lower than the outer and has right and left recesses 155 in the middle for receiving the claws 65 of the casing body 61. Claws 156, 157 are provided at positions of the front- and rear-sides of the wall 153 where they engage with the casing-body grooves 69 and 73, respectively. Here, claws 156, 157 are formed on the walls 153, at places lower than the step 154, unlike those of the first embodiment which extend downward from the brim.

An optical receiver module receptacle 161 and an optical transmitter module receptacle 162 are provided in parallel on the front-side wall, with each of the bottoms being as deep as the level of the step 154. These module receptacles 161, 162, which are almost symmetric to those (71, 72) for the casing body 61, cover the optical receiver and transmitter modules accommodated in the casing body 171. The so-constructed casing cover 171 is metallized on the whole surface through a process, for example, of electroless plating, copper plating and nickel-plating for glossy finishing.

The printed circuit board 81 can be accommodated in the casing body 171 according to the same procedure as illustrated referring to FIG. 7 and FIGS. 8A–8C with the reference number 61 replaced by 171. In the same way, the optical receiver module 53 and optical transmitter module 54 can be accommodated in the casing body 171 according to the same procedure as illustrated referring to FIG. 7 and FIGS. 9A–9E with the reference number 61 replaced by 171.

Figure 18A:
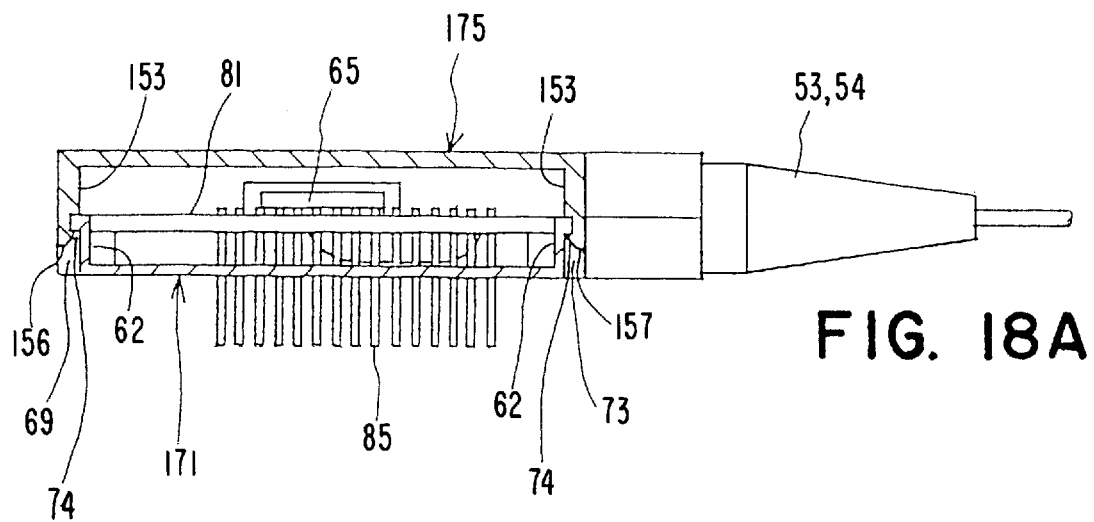
FIG. 18A is a side view in cross section of the assembled optical transceiver unit, with both the rear- and front-side claws 156 and 157 latched with the casing-body grooves 69 and 73, respectively.
Figure 18B:
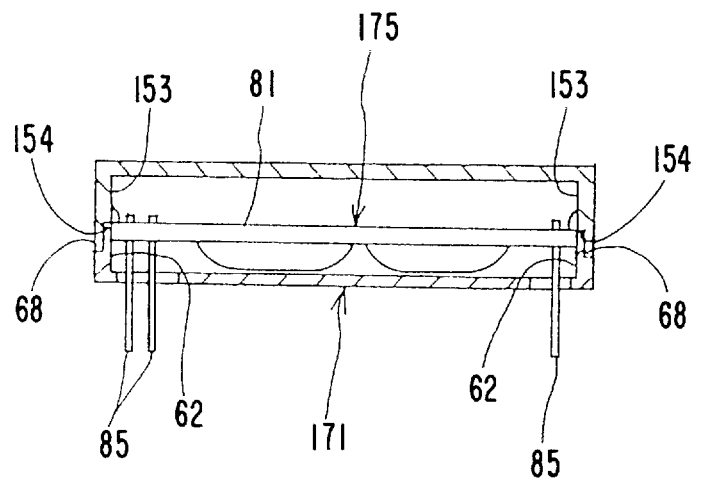
FIG. 18B is a front view in cross section of the assembled optical transceiver unit.

FIG. 18A is a side view in cross section of the assembled optical transceiver unit, with both the rear- and front-side claws 156 and 157 latched with the casing-body grooves 69 and 73, respectively. FIG. 18B is a front view in cross section of the assembled optical transceiver unit.

The printed circuit board 81, optical receiver module 53 and optical transmitter module 54 are mounted in the casing body 171 and the wires are soldered to the connection patterns as shown in FIGS. 17A–17C. Then, the casing cover 175 is positioned on the casing body 61 with the claws 156, 157 directed downwardly (see FIGS. 14A–14C) so that they align with the casing-body grooves 69, 73, respectively. In this state, pressing down the casing cover 175 inserts the claws 156, 157 into the grooves 69, 73 with the claws 156, 157 elastically-deforming outward. When the brim of the casing-lid wall 153 touches that of casing-body wall 62, the tips of the claws 156, 157 elastically-restore to engage with the recesses 74 of the grooves 69, 73 as shown in FIG. 17A.

FIG. 18B shows the state in which the brim of the casing-lid wall 153 touches that of casing-body wall 62, which comes close to the step 154 of the casing-lid wall 153. Thus, the casing-body metallized surface electrically connects to the casing-lid metallized surface and isolates the circuits included therein from the outside. Also, the claws 156, 157 electrically connect to the respective recesses 74.

The fact that the claws 156, 157 are formed on the casing-lid walls 153 and thus the walls 153 elastically-deform in the second embodiment helps provide large latching force and prevent the the casing cover 175 from being removed erroneously, unlike the first embodiment in which the plate projections on which the claws are formed elastically-deform.

An optical receiver unit of the third embodiment of the present invention is explained below, referring to FIGS. 19A–21C.

Figures 20A, 20B:
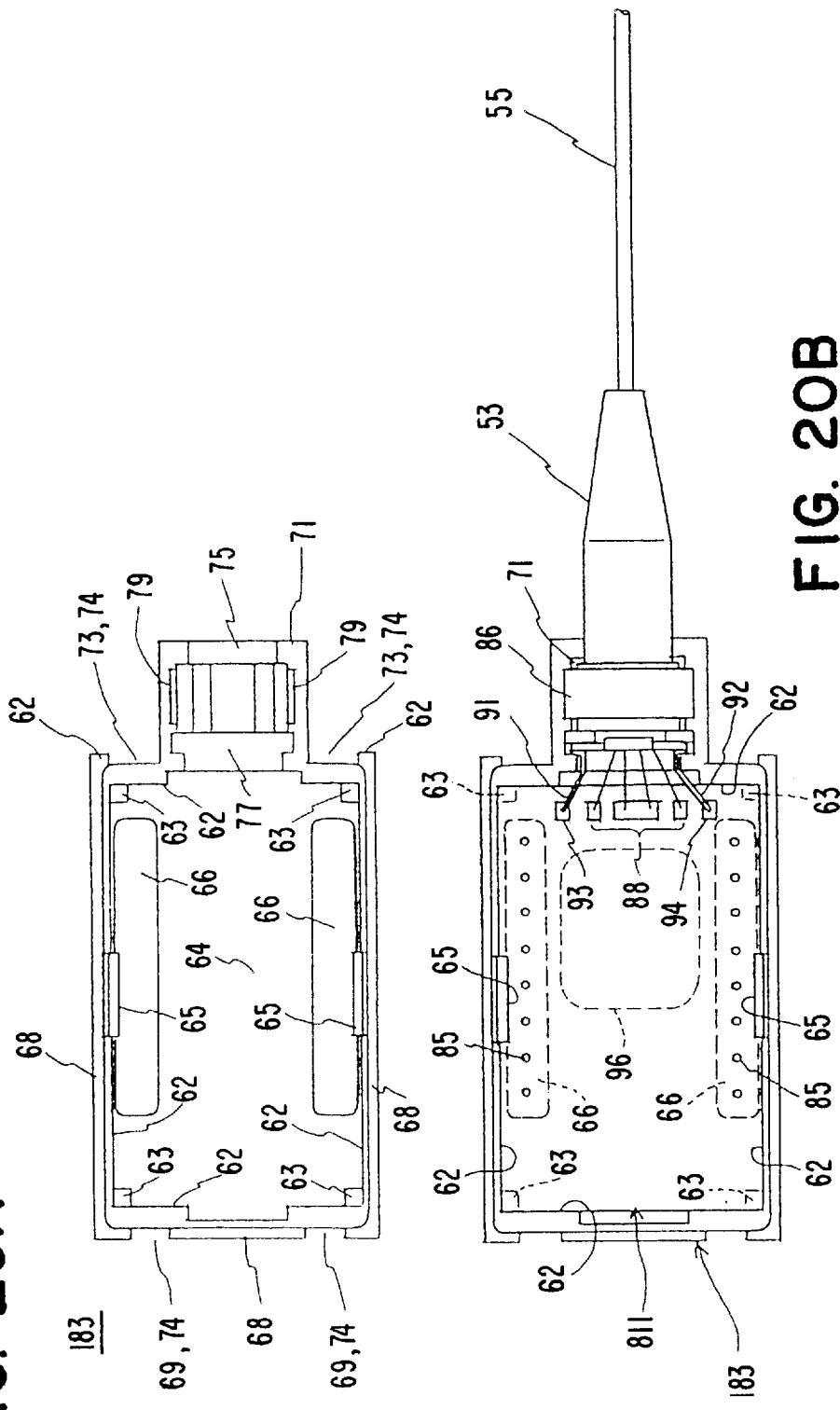
FIG. 20A is a top view of the casing body of a main body 182.
FIG. 20B shows the casing body 183 with the printed circuit board 811 and optical receiver module 53 mounted thereon.

FIGS. 19A and 19B are top and side external views, respectively of the optical receiver unit of the third embodiment of the present invention. FIG. 20A is a top view of the casing body of a main body 182. Side and front views correspond to FIGS. 6B and 6C or FIGS. 16B and 16C. It is assumed in FIG. 20A that the right, left, upper, lower, reverse and obverse sides of the page to are front, rear, right, left, bottom and top sides of the module, respectively.

An optical receiver module 53 is mounted on the optical-transceiver-unit main body 182. Optical fiber 55 is connected at one end to the module 53 and at the other end to an optical connector 57. The casing body 183 is molded as a one-piece construction, out of such synthetic resin having excellent moldability and strength as ABS resin. The casing body 183 is shaped like a container having a base 64 surrounded by a wall 62.

For mounting a printed circuit board, steps 63 of predetermined height above the base 64 are provided at four corners of the wall 62. Claws 65 for latching the printed circuit board in position are provided on the right and left sides of the walls 62. A rectangular hole 66 for letting in (i.e., passing through) printed-circuit-board lead terminals is provided on the right and left sides of the base 64. The wall 62 has a step 68 formed on top, where the inner brim is higher than the outer. Grooves 69 for receiving casing-cover claws are provided right and left on the outside of the rear-side wall 62.

A module receptacle 71 for holding the optical receiver module extends from the front-side wall 62. Grooves 73 for receiving casing-lid claws are provided on the wall 62, on both sides of the module receptacle 71. The grooves 69, 73 each have a recess 74 formed between the bottom end and the casing-body base 64. The module receptacle 71 is provided with semicircular recess 75 where the external form of the module fits, collar-holding recess 77 and clamp-inserting hole 79. The so-constructed casing body 183 is metallized on the whole surface through a process, for example, of electroless plating, copper plating and nickel-plating for glossy finishing.

FIG. 20B shows the casing body 183 with the printed circuit board 811 and optical receiver module 53 mounted thereon.

The multi-layer (4- or 8-layer) printed circuit board 811 fits in an area (board receptacle) formed by the casing-body wall 62, with the reverse side placed on steps 63 at the four corners of the casing body 61 and with the right and left sides engaged with the claws 65. Since the printed circuit board 811 contacts the steps 63 at the four corners, the ground patterns printed on the four reverse-side corners is connected to the metallized casing-body surface via the upper surface of the steps 63, thus grounding the metallized casing-body surface.

For easy understanding, electronic parts mounted on the printed circuit board 811 are not shown in FIG. 20B. The printed circuit board 811 has lead terminals 85 arranged in line on the right side at a predetermined pitch and extending downwardly through the casing-body rectangular holes 66. The lead terminals 85 connect to a main printed-circuit board on which the optical receiver unit is mounted.

The optical receiver module 53 is placed in a casing-body module receptacle 71 and fastened there with a metal clamp 86. The optical receiver module 53 houses a sealed metal container having a photo diode circuit and a preamplifier IC built in. The optical receiver module 53 is light-to-light connected to an optical fiber 55.

Four wires from the sealed metal container are soldered to respective connection patterns 88 printed on a side of the printed circuit board 811. One of the wires outputs circuit ground of the aforesaid internal circuits via the metal container. The other one outputs an electric signal through a glass terminal (not shown). The other two, which are connected to a common connection terminal, respectively supply power to the preamplifier IC, supply a bias voltage to the photo diode through the glass terminals. Two additional ground wires 91, 92 are provided on both sides of the metal container, in parallel with the surface of the printed circuit board 81 and soldered to ground patterns 93, 94. The inventors have confirmed by experiment that providing more ground wires is more effective in reducing the influence of electromagnetic interference on the optical receiver unit. A received signal processing LSI chip 96 is resin-sealed on the reverse side of the printed circuit board 811 in the area enclosed in a dotted line in FIG. 20B.

The printed circuit board 811 can be mounted in the casing body 183 according to the same procedure as illustrated referring to FIGS. 8A–8C. Also, the optical receiver module 53 can be accommodated in the module receptacle according to the same procedure as illustrated referring to FIGS. 9A–9E. FIGS. 10A–10C, FIGS. 12A & 12B and FIGS. 15A to 18B may also be referred to as necessary.

FIGS. 21A–21C are inside, front and side views, respectively of a casing cover. It is assumed in FIG. 21A that the right, left, upper, lower, reverse and obverse sides of the page are the front, rear, right, left, top and bottom sides of the module, respectively.

The casing cover 185 is molded as a one-piece construction, out of such synthetic resin having excellent moldability and strength as ABS resin. The casing cover 185 is shaped like a container having the top plate 152 surrounded by a wall 153. The wall 153 has a step 154 formed on top where the inner brim is lower than the outer and has right and left recesses 155 in the middle for receiving the casing-body claws 65. Claws 156 and 157 are provided on the front and rear sides of the wall 153, at the positions where they engage the casing-body grooves 69 and 73, respectively.

An optical receiver module receptacle 161 extends forward from the front-side wall, with each of the bottoms as deep as the level of the step 154. The module receptacle 161, which is almost symmetric to that (71) of the casing body 183, covers the optical receiver module accommodated in the casing body 61. The so-constructed casing cover 185 is metallized on the whole surface through a process, for example, of electroless plating, copper plating and nickel-plating for glossy finishing.

The optical receiver unit can be assembled as shown in FIGS. 19A and 19B by mounting the printed circuit board and the optical receiver module on the casing body 183 and then fixing the casing cover 185 (as shown FIGS. 21A–21C) onto the casing body 183. That is, optical receiver unit can be assembled according to the same procedure as illustrated referring to FIGS. 15A and 15B with the reference number 81 (printed circuit board), 61 (casing body) and 151 (casing lid) replaced by 811, 183 and 185, respectively.

The optical transceiver unit of the third embodiment of the present invention is explained below.

FIGS. 19A–20B and the related description of the optical receiver unit can apply to those of the optical transmitter unit by replacing the optical receiver unit with the optical transmitter unit and replacing the receiving signal processor LSI chip 96 with the transmitting signal processor LSI chip 97. In this embodiment, it is a design choice whether to form a metallized surface on the casing body.

The optical transceiver unit of the fifth embodiment of the present invention is explained below.

In place of the synthetic resin making the casing body and the casing cover in the aforesaid first to fourth embodiment, synthetic resin mixed with a material having excellent thermal conductivity (e.g., approximately 5 to 10 percent aluminum powder or aluminum short fiber by weight) can be used for making both or either of the casing body and the casing cover. Thus, the heat generated by the internal circuits can be dissipated efficiently from the unit. Moreover, the inventors have confirmed by experiment that combining other heat output means to the above configuration can be more effective.

For easy understanding, the casing body and casing cover are explained to be metallized over the whole surface. However, only the portions which are invisible from outside when they are combined each other, i.e., only the interior surfaces need be metallized, since the portions where they contact each other are connected electrically to each other, accordingly isolating the internal circuits from the outside.

The optical receiver and transmitter modules may be arranged not necessarily in parallel, but in a direction opposite or perpendicular to each other.

Further, the claws for latching the casing cover with the casing body may be provided on the casing body or both the casing cover and the casing body.

In summary, since the optical receiver unit, for example, of the present invention is so-constructed, it can easily be assembled as follows. Pressing down the printed circuit board into the casing-body board receptacle automatically latches the printed circuit board in position by means of the claws. Inserting the metal fittings into the casing-body holes with the optical receiver module accommodated in the receiver module receptacle fastens and fixes the optical receiver module to the casing body. Finally, connecting the wires completes the process to install the optical receiver module to the casing body.

Next, pressing down the casing cover onto the casing body automatically latches the casing cover to the casing body by means of the claws and thus, completing the optical receiver unit which can electrically isolate the internal circuits from the outside.

By the same process as for the optical receiver unit, the optical transmitter unit and the optical transceiver unit can easily be completed.

Since, in the optical receiver module, two additional ground wires from the metal container are connected to the printed-circuit-board ground patterns via both (i.e., respective, opposite) sides of the metal container, the opto-electric converter circuit is protected from external electromagnetic interference. By making the casing body and casing cover of a material having excellent thermal conductivity mixed with synthetic resin, the heat generated by the internal circuit can be dissipated efficiently from the unit.

As described above, the present invention can achieve an optical transceiver unit which is simple in configuration, small-sized, light-weight and easy in assembling and which are reliable and proof against electromagnetic interference.

What is claimed is:

1. An optical receiver unit, comprising:
   an optical receiver module having an opto-electric converter which converts an optical signal into an electrical signal;
   a printed-circuit board having a terminal connected to the opto-electric converter;
   a casing body molded out of synthetic resin and defining a receptacle therein accessible through an opening in the casing body and having a first metallized internal surface surrounding the receptacle, the receptacle comprising:
      a board receptacle portion which accommodates said printed-circuit board, and
      a module receptacle portion which accommodates said optical receiver module; and
   a cover, molded out of synthetic resin and having a second metallized internal surface, received on and covering the opening in said casing body so that the second metallized surface of said cover contacts the first metallized surface of said casing body.

2. An optical receiver unit according to claim 1, further comprising:
   a metal container which houses the opto-electric converter; and
   signal and ground terminals on the printed circuit board connected to the opto-electric converter via signal and ground lines, respectively; and
   a ground circuit wiring the ground line to the metal container of said optical receiver module.

3. An optical receiver unit according to claim 2, wherein said ground circuit comprises first and second ground lines wired on respective, first and second opposite sides of the signal line and in parallel with a surface of said printed-circuit board.

4. An optical receiver unit according to claim 1, wherein the synthetic resin, out of which said casing body and said cover are molded, further comprises a conductive material mixed therein.

5. An optical receiver unit according to claim 1, wherein:

said board receptacle portion comprises an elastic first claw for clutching said printed-circuit board to said board receptacle portion;

said module receptacle portion comprises an elastic fitting which clutches said optical receiver module to said module receptacle portion; and one of said casing body and said cover further comprises an elastic claw and the other of said casing body and said cover further comprises a claw engaging surface, the claw selectively engaging the claw engaging surface and clutching said cover and said casing body together.

6. An optical receiver unit according to claim 5, wherein said first claw is constructed of a material and in a configuration so as to elastically deform and thereby to allow said printed-circuit board to be forcibly inserted into said board receptacle portion and, when said printed-circuit board has been so inserted, so as to elastically restore and thereby to clutch said printed-circuit board to said board receptacle portion.

7. An optical receiver unit according to claim 5, wherein:

said module receptacle portion further comprises a hole; and said fitting and said hole are constructed of respective materials and configurations such that said fitting elastically deforms when being forcibly inserted into said hole and, when fully inserted into said hole, said fitting elastically restores thereby to clutch said optical receiver module to said module receptacle portion.

8. An optical receiver unit according to claim 5, wherein said second claw is provided on said casing body and is constructed of a material and a configuration such that when said cover is forced to a closed position with respect to said casing body, said second claw elastically deforms to allow said cover to be closed and, when said cover is closed, said second claw elastically restores thereby to clutch said cover to said casing body.

9. An optical transmitter unit, comprising:

an optical transmitter module having an electro-optical converter which converts an electric signal into an optical signal;

a printed-circuit board having a terminal connected to the electro-optical converter;

a casing body molded out of synthetic resin and defining a receptacle therein accessible through an opening in the casing body and having a conductive property on at least an internal surface of the receptacle, the receptacle, comprising:

a board receptacle portion which accommodates said printed-circuit board, and a module receptacle portion which accommodates said optical transmitter module; and a cover, molded out of a synthetic resin and having a conductive property on at least an interior surface thereof, received on and covering the opening in said casing body so that the second metallized surface of the said cover contacts the first metallized surface of the said casing body.

10. An optical transmitter unit according to claim 9, wherein:

said board receptacle portion further comprises an elastic claw for clutching said printed-circuit board to said board receptacle portion;

said module receptacle portion further comprises an elastic fitting which clutches said optical transmitter module to said module receptacle portion, and one of said casing body and said cover further comprises an elastic claw and the other of said casing body and said cover further comprises a claw engaging surface, the claw selectively engaging the claw engaging surface and clutching said cover and said casing body together.

11. An optical transmitter unit as recited in claim 9, wherein the synthetic resin, out of which said casing body and said cover are molded, further comprises a conductive material mixed therein.

12. An optical transmitter unit as recited in claim 9, wherein the casing body and the cover have respective internal metallized surfaces, the metallized surface of the cover contacting that of the casing body when the cover is received on the casing body, covering the opening therein.

13. An optical transceiver unit, comprising:

an optical receiver module having an opto-electric converter which converts an optical signal into an electrical signal;

an optical transmitter module having an electro-optical converter which converts an electric signal into an optical signal;

a printed-circuit board having terminals connected to the opto-electric converter and the electro-optical converter;

a casing body, molded out of synthetic resin, defining a receptacle therein accessible through an opening in the casing body and having a first metallized internal surface surrounding the receptacle, the receptacle comprising, a board receptacle portion which accommodates said printed-circuit board, a receiver module receptacle portion which accommodates said optical receiver module, and a transmitter module receptacle portion which accommodates said optical transmitter module; and a cover, molded out of synthetic resin and having a second metallized internal surface, received on and covering the opening in said casing body so that the second metallized surface thereof contacts the first metallized surface of said casing body.

14. An optical transceiver unit according to claim 8, further comprising:

a metal container which houses the opto-electric converter; and signal and ground terminals on the printed circuit board connected to the opto-electric converter via signal and ground lines, respectively; and a ground circuit wiring the ground line to the metal container of said optical receiver module.

15. An optical transceiver unit according to claim 14, wherein said ground circuit comprises first and second ground lines wired on respective, first and second opposite sides of the signal line and in parallel with a surface of said printed-circuit board.

16. An optical transceiver unit according to claim 13, wherein the synthetic resin, out of which said casing body and said cover are molded, further comprises a conductive material which is mixed therein.

17. An optical transceiver unit according to claim 13, wherein:

said board receptacle portion further comprises an elastic claw which clutches said printed-circuit board to said board receptacle portion;

said receiver module receptacle portion further comprises an elastic fitting which clutches said optical receiver module to said receiver module receptacle portion;

said transmitter module receptacle portion further comprises an elastic fitting which clutches said optical transmitter module to said transmitter module receptacle portion; and one of said casing body and said cover further comprises an elastic claw and the other of said casing body and said cover further comprises a claw engaging surface, the claw selectively engaging the claw engaging surface and clutching said cover and said casing body together.

18. An apparatus, comprising:

an opto-electric converter;

a printed-circuit board having a terminal connected to the opto-electric converter;

a casing body, of a molded synthetic resin material, defining a receptacle therein accessible through an opening in the casing body and having a first metallized internal surface surrounding the receptacle, the receptacle including:
- a first receptacle portion which accommodates said printed-circuit board, and
- a second receptacle portion which accommodates said opto-electric converter; and a cover, of a molded synthetic resin material and having a second metallized internal surface, received on and covering the opening in said casing body so that the second metallized internal surface of said cover contacts the first metallized internal surface of said casing body.

19. The apparatus according to claim 18, further comprising:

a metal container which houses the opto-electric converter; and signal and power terminals on the printed circuit board connected to the opto-electric converter via signal and power lines, respectively; and a ground circuit wiring a ground level of said printed circuit board to said metal container.

20. The apparatus according to claim 19, wherein:

said ground circuit comprises first and second lines wired on respective, first and second opposite sides of at least the signal line and in parallel with a surface of said printed-circuit board.

21. The apparatus according to claim 18, wherein the synthetic resin material further comprises a material having high thermal conductivity, relatively to the thermal conductivity of the synthetic resin, mixed with the synthetic resin.

22. The apparatus according to claim 18, wherein:

said first receptacle portion further comprises an elastic first claw for clutching said printed-circuit board to said first receptacle portion;

said second receptacle portion further comprises an elastic fitting which clutches said opto-electric converter to said second receptacle portion; and one of said casing body and said cover further comprises an elastic second claw and the other of said casing body and said cover further comprises a claw engaging surface, the second claw selectively engaging the claw engaging surface and clutching said cover and said casing body together.

23. The apparatus according to claim 22, wherein said first claw is constructed of a material and in a configuration so as to elastically deform and thereby to allow said printed-circuit board to be forcibly inserted into said first receptacle portion and, when said printed-circuit board has been so inserted, so as to elastically restore and thereby to clutch said printed-circuit board to said first receptacle portion.

24. The apparatus according to claim 22, wherein:

said second receptacle portion further comprises a hole; and said fitting and said hole are constructed of respective materials and configurations such that said fitting elastically deforms when being forcibly inserted into said hole and, when fully inserted into said hole, said fitting elastically restores thereby to clutch said opto-electric converter to said second receptacle portion.

25. The apparatus according to claim 22, wherein said second claw is provided on said casing body and constructed such that when said cover is forced to close, said second claw elastically deforms to allow said cover to be closed and, when said cover has been closed, said second claw elastically restores to clutch said cover to said casing body.

26. An apparatus, comprising:

an electro-optical converter;

a printed-circuit board having a terminal connected to the electro-optical converter;

a casing body of a molded synthetic resin material defining a receptacle therein accessible through an opening in the casing body and having an electrical conductive property on at least an internal surface of the receptacle, the receptacle including:
- a first receptacle portion which accommodates said printed-circuit board, and
- a second receptacle portion which accommodates said electro-optical converter; and a cover, of a molded synthetic resin material and having an electrical conductive property on at least an internal surface thereof, received on and covering the opening in said casing body so that the internal surface, having an electrical conductive property, of said cover contacts the internal surface, having an electrical conductive property, of said casing body.

27. The apparatus according to claim 26, wherein:

said first receptacle portion further comprises an elastic claw for clutching said printed-circuit board to said board receptacle portion;

said second receptacle portion further comprises an elastic fitting which clutches said electro-optical converter to said module receptacle portion; and one of said casing body and said cover further comprises an elastic claw and the other of said casing body and said cover further comprises a claw engaging surface, the claw selectively engaging the claw engaging surface and clutching said cover and said casing body together.

28. The apparatus as recited in claim 26, wherein the synthetic resin material further comprises a conductive material mixed therein.

29. The apparatus as recited in claim 26, wherein the casing body and the cover have respective internal metallized surfaces, the metallized surface of the cover contacting that of the casing body when the cover is received on the casing body, covering the opening therein.

30. An apparatus, comprising:

an opto-electric converter;

an electro-optical converter;

a printed-circuit board having terminals connected to the opto-electric converter and the electro-optical converter;

a casing body, of a molded synthetic resin material, defining a receptacle therein accessible through an opening in the casing body and having a first metallized internal surface surrounding the receptacle, the receptacle including:
  a first receptacle portion which accommodates said printed-circuit board,
  a second receptacle portion which accommodates said opto-electric converter, and
  a third receptacle portion which accommodates said electro-optic converter; and
a cover, of a molded synthetic resin material and having a second metallized internal surface, received on and covering the opening in said casing body so that the second metallized surface thereof contacts the first metallized surface of said casing body.

31. The apparatus according to claim 30, further comprising:
  a metal container which houses the opto-electric converter;
  signal and power terminals on the printed circuit board connected to the opto-electric converter via signal and power lines, respectively; and
  a ground circuit wiring a ground level of said printed circuit board to said metal container.

32. The apparatus according to claim 31, wherein: said ground circuit comprises first and second lines wired on respective, first and second opposite sides of at least the signal line and in parallel with a surface of said printed-circuit board.

33. The apparatus according to claim 30, wherein the synthetic resin material further comprises a material having high thermal conductivity, relatively to the thermal conductivity of the synthetic resin, mixed with the synthetic resin.

34. The apparatus according to claim 30, wherein:
  said first receptacle portion further comprises an elastic claw which clutches said printed-circuit board to said board receptacle portion;
  said second receptacle portion further comprises an elastic fitting which clutches said opto-electric converter to said second receptacle portion;
  said second receptacle portion further comprises an elastic fitting which clutches said opto-electric converter to said third receptacle portion; and
  one of said casing body and said cover further comprises an elastic claw and the other of said casing body and said cover further comprises a claw engaging surface, the claw selectively engaging the claw engaging surface and clutching said cover and said casing body together.

* * * * *

UNITED STATES PATENT AND TRADEMARK OFFICE
CERTIFICATE OF CORRECTION

PATENT NO. : 5,875,047
DATED : February 23, 1999
INVENTOR(S) : Akio ABE et al.

It is certified that error appears in the above-indentified patent and that said Letters Patent is hereby corrected as shown below:

Col. 1, line 21, after "unit" (first occurrence) insert --,--;
line 27, change "there of" to --thereof--;
line 32, change "extended" to --extruded--.

Col. 2, line 28, change "there of" to --thereof--;
line 36, change "segments" to --segment--.

Col. 3, line 2, after "metal" insert --;-- and delete "and";
line 49, after "assembled" insert --,--.

Col. 4, lines 39-40, delete "respectively";
line 64, change "the" (first occurrence) to --a--.

Col. 5, line 23, after "respectively" insert --,--.

Col. 6, line 13, change "stand" to --withstand--;
line 45, after "thereof" insert --,--;
line 59, after "9D" insert --;--.

Col. 7, line 44, change "One" to --A wire 116--;
line 46, change "three" to --wires 117--;
line 50, change "both" to --respective, opposite--;
line 55, change "fittings" to --fitting--.

UNITED STATES PATENT AND TRADEMARK OFFICE
CERTIFICATE OF CORRECTION

PATENT NO. : 5,875,047
DATED : February 23, 1999
INVENTOR(S) : Akio ABE et al.

It is certified that error appears in the above-indentified patent and that said Letters Patent is hereby corrected as shown below:

Col. 8,  line 1, change "and" to --end--;
line 13, change "One (127)" to --A wire 127--;
line 15, change "two (128)" to --three wires 128--;
line 54, change "more" to --a greater or increased,--.

Col. 10, line 15, after "respectively" insert --,--;

Col. 13, line 54, after "combined" insert --with--;
line 55, after "surfaces" insert --,--.

Signed and Sealed this

Nineteenth Day of October, 1999

Q. TODD DICKINSON

*Attest:*

*Attesting Officer*   Acting Commissioner of Patents and Trademarks